US011028543B2

(12) United States Patent
Langford et al.

(10) Patent No.: US 11,028,543 B2
(45) Date of Patent: Jun. 8, 2021

(54) APPARATUS, SYSTEM, AND METHOD FOR SMART ROADWAY STUD CONTROL AND SIGNALING

(71) Applicant: MZC Foundation, Inc., Atlanta, GA (US)

(72) Inventors: Harriet Anderson Langford, LaGrange, GA (US); A. Philip Langford, LaGrange, GA (US); Alan J. Anderson, Woodinville, WA (US); John Picard, Atherton, CA (US); Allison Kelly Beaton, Chattahoochee Hills, GA (US); Glenn Le Faou, Cambridge (GB); Laura Churcher, Cambridge (GB); James Salisbury, Cambridge (GB); Marie Buda, Cambridge (GB); Edward Colby, Cambridge (GB); Andy Milton, Cambridge (GB)

(73) Assignee: MZC Foundation, Inc., Atlanta, GA (US)

( * ) Notice: Subject to any disclaimer, the term of this patent is extended or adjusted under 35 U.S.C. 154(b) by 0 days.

(21) Appl. No.: 16/806,582

(22) Filed: Mar. 2, 2020

(65) Prior Publication Data
US 2020/0199832 A1 Jun. 25, 2020

Related U.S. Application Data

(63) Continuation of application No. 15/962,802, filed on Apr. 25, 2018, now Pat. No. 10,577,763.
(Continued)

(51) Int. Cl.
*E01F 9/559* (2016.01)
*G08G 1/052* (2006.01)
(Continued)

(52) U.S. Cl.
CPC .............. *E01F 9/559* (2016.02); *F21S 8/032* (2013.01); *F21S 9/037* (2013.01); *G01W 1/02* (2013.01);
(Continued)

(58) Field of Classification Search
None
See application file for complete search history.

(56) References Cited

U.S. PATENT DOCUMENTS 4,904,998 A 2/1990 Niimi
5,074,706 A 12/1991 Paulos
(Continued)

FOREIGN PATENT DOCUMENTS

AU 2009222508 A1 10/2009
DE 10152223 A1 4/2003
(Continued)

OTHER PUBLICATIONS

USPTO; Non-Final Office Action for U.S. Appl. No. 15/962,802, dated Feb. 14, 2019, 19 pages.

*Primary Examiner* — Chico A Foxx
(74) *Attorney, Agent, or Firm* — NK Patent Law

(57) ABSTRACT

The subject matter described herein includes a roadway stud control system including a local stud control system positioned along a first section of a roadway, a plurality of roadway studs, each roadway stud disposed on a surface of the first section of the roadway and communicably coupled to the local stud control system, wherein the local stud control system is configured to communicate a control signal to control at least one aspect of the plurality of roadway studs.

17 Claims, 14 Drawing Sheets

Related U.S. Application Data

(60) Provisional application No. 62/489,818, filed on Apr. 25, 2017.

(51) Int. Cl.

| | |
|---|---|
| *G08G 1/16* | (2006.01) |
| *G08G 1/048* | (2006.01) |
| *G08G 1/01* | (2006.01) |
| *G08G 1/095* | (2006.01) |
| *F21S 9/03* | (2006.01) |
| *F21S 8/00* | (2006.01) |
| *G08G 1/042* | (2006.01) |
| *G08G 1/017* | (2006.01) |
| *G01W 1/02* | (2006.01) |
| *H05B 45/10* | (2020.01) |
| *H05B 47/19* | (2020.01) |
| *F21W 111/02* | (2006.01) |
| *G06F 1/26* | (2006.01) |
| *F21Y 115/10* | (2016.01) |
| *H05B 47/11* | (2020.01) |

(52) U.S. Cl.
CPC ......... *G08G 1/0116* (2013.01); *G08G 1/0133* (2013.01); *G08G 1/0175* (2013.01); *G08G 1/042* (2013.01); *G08G 1/048* (2013.01); *G08G 1/052* (2013.01); *G08G 1/095* (2013.01); *G08G 1/164* (2013.01); *G08G 1/166* (2013.01); *H05B 45/10* (2020.01); *H05B 47/19* (2020.01); *F21W 2111/02* (2013.01); *F21Y 2115/10* (2016.08); *G06F 1/26* (2013.01); *G08G 1/167* (2013.01); *H05B 47/11* (2020.01)

(56) References Cited

U.S. PATENT DOCUMENTS

| | | | |
|---|---|---|---|
| 5,412,381 A | 5/1995 | Dicks | |
| 5,839,816 A | 11/1998 | Varga et al. | |
| 5,975,983 A | 11/1999 | Panec | |
| 6,345,233 B1* | 2/2002 | Erick | B61L 25/021 |
| | | | 340/901 |
| 6,384,742 B1 | 5/2002 | Harrison | |
| 6,597,293 B1 | 7/2003 | Harrison | |
| 7,018,131 B2 | 3/2006 | Jordan | |
| 7,021,857 B2 | 4/2006 | Van Der Poel | |
| 7,025,525 B2 | 4/2006 | Van Der Poel | |
| 7,347,643 B2 | 3/2008 | Jeong | |
| D565,447 S | 4/2008 | Horng | |
| 7,688,222 B2 | 3/2010 | Peddie et al. | |
| 7,859,431 B2 | 12/2010 | Peddie et al. | |
| 8,704,676 B2 | 4/2014 | Hawkes et al. | |
| 8,840,335 B2 | 9/2014 | Martin et al. | |
| 9,466,211 B1 | 10/2016 | Gesmundo | |
| 9,536,425 B1 | 1/2017 | Soltesz et al. | |
| 9,595,192 B1 | 3/2017 | Alrashid | |
| 9,702,098 B1 | 7/2017 | King | |
| 9,807,850 B1 | 10/2017 | Park | |
| 10,145,993 B1 | 12/2018 | Hadi et al. | |
| 2004/0216470 A1 | 11/2004 | Thomas et al. | |
| 2005/0040970 A1 | 2/2005 | Hutchins et al. | |
| 2005/0238425 A1 | 10/2005 | Safar | |
| 2005/0244225 A1* | 11/2005 | Jordan | E01F 9/559 |
| | | | 404/16 |
| 2006/0193691 A1 | 8/2006 | Gonzalez et al. | |
| 2006/0257205 A1 | 11/2006 | Jordan et al. | |
| 2007/0001872 A1 | 1/2007 | Ellison | |
| 2007/0223996 A1 | 9/2007 | Green et al. | |
| 2007/0280781 A1 | 12/2007 | Jeong | |
| 2008/0216367 A1 | 9/2008 | Van Der Poel | |
| 2008/0246630 A1 | 10/2008 | Rosemeyer et al. | |
| 2009/0319163 A1* | 12/2009 | Sutter | G08G 1/207 |
| | | | 701/117 |
| 2011/0098910 A1* | 4/2011 | Saarimaki | G01C 21/3644 |
| | | | 701/532 |
| 2011/0135386 A1 | 6/2011 | Sahota | |
| 2012/0020060 A1 | 1/2012 | Myer et al. | |
| 2012/0293317 A1* | 11/2012 | Hanna | B60K 23/08 |
| | | | 340/441 |
| 2013/0038461 A1 | 2/2013 | Hawkes et al. | |
| 2013/0113618 A1 | 5/2013 | Flanagan et al. | |
| 2014/0197955 A1 | 7/2014 | Martin et al. | |
| 2014/0236514 A1* | 8/2014 | Icove | G01V 3/15 |
| | | | 702/65 |
| 2014/0333469 A1* | 11/2014 | Nagy | G01S 7/41 |
| | | | 342/59 |
| 2015/0161889 A1 | 6/2015 | Martin et al. | |
| 2015/0179069 A1 | 6/2015 | Cazanas et al. | |
| 2016/0076207 A1 | 3/2016 | Moran et al. | |
| 2016/0082957 A1 | 3/2016 | Zsombory et al. | |
| 2016/0328961 A1* | 11/2016 | Garces Cadenas | G01V 3/08 |
| 2017/0002527 A1 | 1/2017 | Bahiri et al. | |
| 2019/0088121 A1 | 3/2019 | Linville et al. | |
| 2019/0276997 A1 | 9/2019 | Bahiri et al. | |
| 2019/0291698 A1* | 9/2019 | Camella | B60S 1/68 |

FOREIGN PATENT DOCUMENTS

| | | |
|---|---|---|
| EP | 1336690 A2 | 8/2003 |
| GB | 2303906 A | 3/1997 |
| GB | 2314107 A | 12/1997 |
| GB | 2449979 A | 12/2008 |
| GB | 2478560 A | 9/2011 |
| GB | 2487674 A | 8/2012 |
| GB | 2487675 A | 8/2012 |
| GB | 2491302 A | 11/2012 |
| UA | 41260 C2 | 9/2001 |
| WO | 8807606 A1 | 10/1988 |
| WO | WO02099201 A1 | 12/2002 |
| WO | 2005080689 A2 | 9/2005 |
| WO | 2005083800 A1 | 9/2005 |
| WO | 2005104799 A2 | 11/2005 |
| WO | 2007056109 A2 | 5/2007 |
| WO | 2008109947 A1 | 9/2008 |
| WO | 2011002159 A2 | 1/2011 |
| WO | 2011110800 A1 | 9/2011 |
| WO | 2012074201 A2 | 6/2012 |
| WO | 2013117887 A1 | 8/2013 |
| WO | 2013176354 A1 | 11/2013 |
| WO | 2016039913 A1 | 3/2016 |

* cited by examiner

APPARATUS, SYSTEM, AND METHOD FOR SMART ROADWAY STUD CONTROL AND SIGNALING

CROSS-REFERENCE TO RELATED APPLICATIONS

This application is a continuation of U.S. patent application Ser. No. 15/962,802 filed Apr. 25, 2018, entitled "APPARATUS, SYSTEM, AND METHOD FOR SMART ROADWAY STUD CONTROL AND SIGNALING", which claims priority to U.S. Provisional Patent Application No. 62/489,818 filed Apr. 25, 2017, entitled "APPARATUS, SYSTEM, AND METHOD FOR SMART ROADWAY STUD CONTROL AND SIGNALING". The disclosure of each of the aforementioned applications is incorporated herein by reference in their entireties.

TECHNICAL FIELD

The presently disclosed subject matter is generally directed to traffic control and management and more specifically to apparatuses, systems, and methods for smart roadway studs and stud control and signaling.

BACKGROUND

Roadways connect our communities, by providing a quick, convenient pathway to travel across the country. From large cities with twelve lane or more highways in each direction to two-lane country roads, the vehicle roadway has become the preferred mode of transportation in the United States. For all of the benefits provided by vehicle roadways, they also create critical problems. At an increasing rate, these roadways threaten the lives of the very people that drive on them each day.

Since 2011, the US has seen a 5.3% increase in roadway fatalities. Causes of fatalities include aggressive driving, distracted driving, impaired driving, failure to yield, poor judgement, and other varieties of reasons. In 2016 alone, over 40,000 people were killed on U.S. roadways, and countless more were injured. Part of the increase in the total number of road fatalities stems from the improving economy, which has led Americans to drive more miles for both work and pleasure. But that is not the whole story. The number of roadway fatalities as a percentage of miles driven is also increasing.

Hundreds of millions of dollars have been spent on campaigns to remind the public of the dangers of impaired driving, aggressive driving, distracted driving and poor judgement on the roadways. These campaigns are passive mechanisms for informing the public of the potential dangers on the roadway. However, most drivers consider these major causes or roadway fatalities to be "everyone else's problem" and not something they personally are doing to increase the level of danger on the roadway for themselves and those in the vehicles around them.

While police and other traffic enforcement officers can try to monitor driving habits and remove or ticket those who fail to drive safely, there are only a limited number of officers to cover the millions of miles of roadway. Further, many of the major causes of roadway fatalities are caused by a limited duration issue, (e.g., distracted driving or aggressive driving) which can be difficult for officers to see unless they are lucky enough to witness the event. Even then it may be too late to stop another fatality. An in-pavement device and system that can actively monitor vehicle and driver behaviors on a roadway and provide instant feedback, either to the particular driver and/or those other drivers in the immediate vicinity, can provide an immediate indicator of roadway issues that can change driver behavior and potentially reduce roadway injuries and fatalities.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a roadway stud control system, including a local stud control system positioned along a first section of a roadway, a plurality of roadway studs, each roadway stud disposed on a surface of the first section of the roadway and communicably coupled to the local stud control system, where the local stud control system is configured to communicate a control signal to control at least one aspect of the plurality of roadway studs.

According to one or more embodiments, the roadway stud control system includes a second local stud control system positioned along a second section of the roadway different from the first section, a second plurality of roadway studs, each roadway stud disposed on a surface of the second section of the roadway and communicably coupled to the second local stud control system, where the second local stud control system is configured to communicate a control signal to control the at least one aspect of the second plurality of roadway studs, and a remote stud control system communicably coupled to the local stud control system and the second local stud control system.

According to one or more embodiments, the roadway stud control system, where the local stud control system includes a computer processor, a rechargeable battery communicably coupled to the processor, a control signal transmitting element to control at least one aspect of the plurality of roadway studs communicably coupled to the computer processor, and an antenna communicably coupled to the control signal transmitting element.

According to one or more embodiments, the roadway stud control system, where the local stud control system includes at least one of a Doppler radar detector communicably coupled to the processor, a camera communicably coupled to the processor, and a solar panel communicably coupled to the rechargeable battery.

According to one or more embodiments, an apparatus includes a smart roadway stud, at least a portion of which being configured to be positioned along a surface of a roadway, the stud includes a housing, a processor disposed within the housing, a communication element disposed within the housing and communicably coupled to the processor and configured to communicate with a local stud control system, a rechargeable battery disposed within the housing and communicably coupled to the processor, at least one solar panel communicably coupled to the rechargeable battery, at least one light source communicably coupled to the processor and configured to generate a light output from the stud, and a vehicle sensing element communicably coupled to the processor and configured to sense a vehicle passing adjacent to the stud.

According to one or more embodiments, the apparatus, where the stud includes a temperature sensing element communicably coupled to the processor and configured to sense ambient temperature.

According to one or more embodiments, where the stud includes a light sensing element communicably coupled to the processor and configured to measure or sense an ambient light level.

According to one or more embodiments, the apparatus, where the stud includes a cover disposed over at least a portion of the housing, where at least a portion of the cover is transparent and where the cover includes at least one light focusing element for focusing or dispersing light generated by the at least one light source.

According to one or more embodiments, a method of controlling at least one roadway stud along a roadway includes, receiving a first temperature data from a first roadway stud, comparing the first temperature data to a first temperature threshold parameter, determining, based on the comparison, that the first temperature data violates the first temperature threshold parameter, determining at least one second roadway stud associated with the first roadway stud, generating a light emitting diode (LED) activation signal, and transmitting the LED activation signal to the first roadway stud and the second roadway stud, where the first roadway stud and the second roadway stud are configured to generate a light output of a first color in response to receiving the LED activation signal.

According to one or more embodiments, a method of controlling light level output at an at least one roadway stud along a roadway, includes receiving a first light intensity data from a first roadway stud, comparing the first light intensity data to a first light level threshold parameter, determining, based on the comparison, that the first light intensity data violates the first light level threshold parameter, determining at least one of a light emitting diode (LED) level and color to generate at the at least one roadway stud based on the first light intensity data, generating an LED activation signal comprising the at least of the LED level and color to generate at the at least one roadway stud, and transmitting the LED activation signal to the at least one roadway stud, where the at least one roadway stud is configured to generate a light output of at least one of the first color and first intensity in response to receiving the LED activation signal.

According to one or more embodiments, a method of illuminating a plurality of roadway studs along a roadway, includes accepting a current safe travel speed for a first section of the roadway, identifying a first color associated with the current safe travel speed for the first section of the roadway, calculating a timing difference to illuminate each of the plurality of road studs, wherein the timing difference of illuminating each of the plurality of road studs is configured to substantially equal the current safe travel speed, and transmitting an illumination sequence signal to each of the plurality of road studs disposed along the first section of the roadway, where each of the plurality of road studs is configured to generate a light output of the first color in a sequence that substantially equals the current safe travel speed along the first section of the roadway.

According to one or more embodiments, a method of determining lane change safety for a vehicle on a roadway includes detecting, at a plurality of road studs on the roadway, a plurality of magnetic field changes, where each of the plurality of magnetic field changes is caused by a vehicle passing one of the plurality of road studs, recording an event vector comprising an event time, an event magnitude, and an event duration, for each detection of the plurality of magnetic field changes, determining a first position and first speed for a first vehicle in a first lane on the roadway based on a portion of the plurality of event vectors, determining a second position and second speed for a second vehicle in a second lane on the roadway based on a second portion of the plurality of event vectors, generating a prediction model of the first position and the first speed of the first vehicle and the second position and second speed of the second vehicle on the roadway, determining a location and spacing for each of the first vehicle and the second vehicle, determining that one or more of the location, the spacing, and the first speed for the first vehicle violates a lane change threshold parameter with regard to the location of the second vehicle, and transmitting a lane change warning signal to each of a plurality of road studs near the first position on the roadway, where each of the plurality of road studs is configured to generate a light output of a first color in response to receiving the lane change warning signal.

According to one or more embodiments, a method of determining if a driver of a vehicle on a roadway is impaired, includes detecting, at a plurality of road studs on the roadway, a plurality of magnetic field changes, wherein each of the plurality of magnetic field changes is caused by a vehicle passing one of the plurality of road studs, recording an event vector comprising an event time, an event magnitude, and an event duration, for each detection of the plurality of magnetic field changes, determining a first position and first speed for a first vehicle on the roadway at a first time based on a portion of the plurality of event vectors, generating a prediction model of a first future position and first future speed for the first vehicle on the roadway at a first future time based on the first position and the first speed of the first vehicle on the roadway, determining a second position and second speed for the first vehicle on the roadway at a second time subsequent to the first time based on a second portion of the plurality of event vectors, where the second time equals the first future time, determining that at least one of the second position and second speed for the first vehicle is different than the first future speed and the first future position for the first vehicle, comparing, based on at least one of the second position and second speed for the first vehicle being different than the first future speed and the first future position for the first vehicle, a position history and a speed history for the first vehicle to at least one impairment parameter, determining, based on the comparison, that the first vehicle violates at least one of the at least one impairment parameter; and transmitting an impairment notification signal to each of a plurality of road studs near the second position on the roadway, where each of the plurality of road studs is configured to generate a light output of a first color in response to receiving the impairment notification signal.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
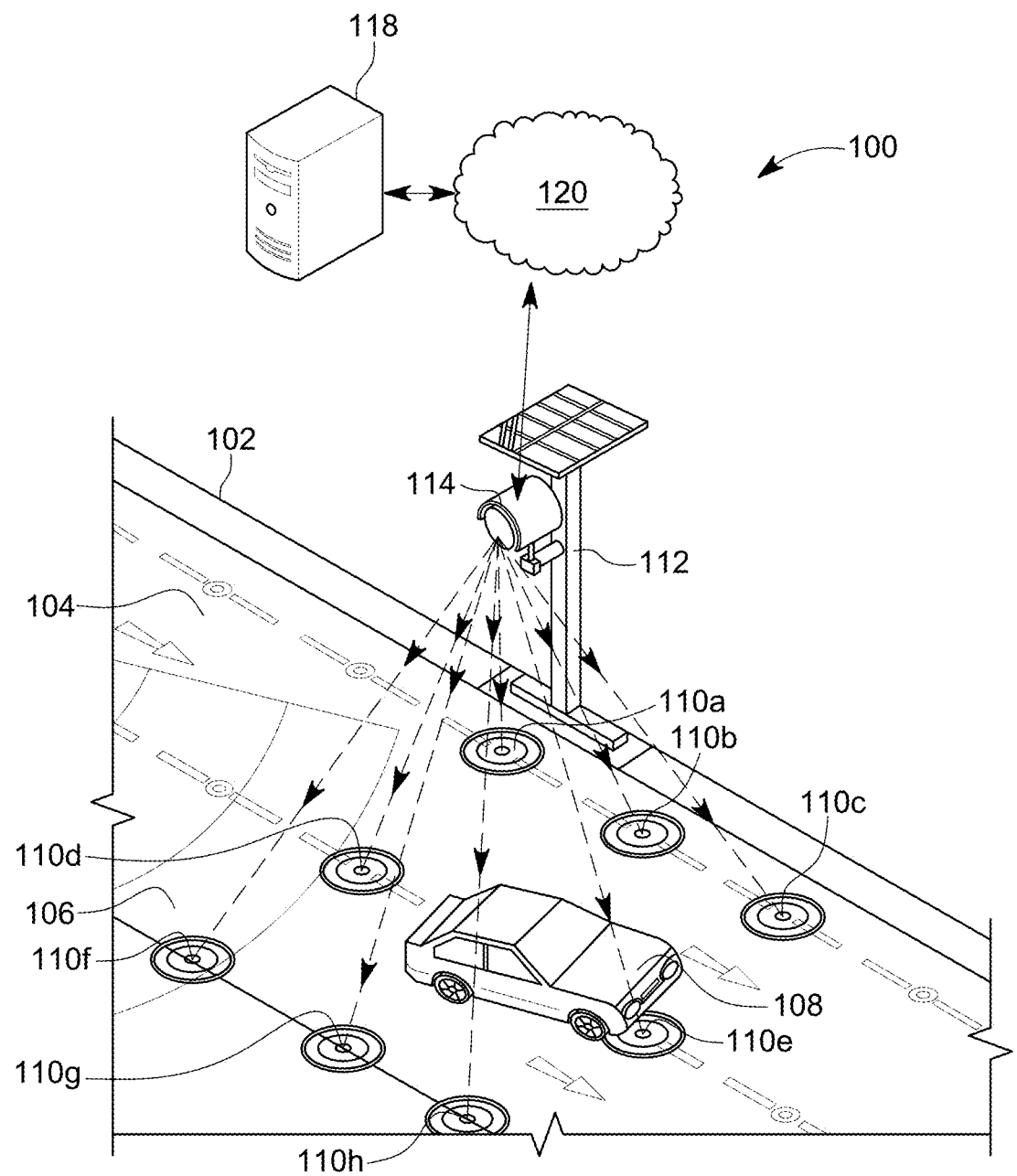
FIG. 1 is a simplified diagram illustrating a portion of an operating environment for a smart roadway stud control system positioned along a roadway, according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

FIG. 1 is a simplified diagram illustrating an example portion of an operating environment 100 for the example smart roadway stud control system positioned along a roadway, in accordance with one example embodiment of the disclosure. The example operating environment 100 may include a roadway 102. The example roadway 102 is shown having a first lane 104 and a second lane 106; however, this is for example purposes only as one or more lanes (e.g., anywhere between 3-20 lanes or more) can be provided in other example embodiments of the roadway 102. Further, the example roadway 102 is shown having both the first lane 104 and the second lane 106 having the same direction of travel (e.g., shown via arrows in the roadway 102). However, this is also for example purposes only as in other example embodiments, the roadway 102 can include one or more lanes (e.g., 104, 106) that run in the same or opposing directions. The roadway 102 is configured to have multiple vehicles 108 travelling along the roadway 102 in the path of travel. While FIG. 1 shows an automobile as the vehicle 108, this is for example purposes only as other forms of vehicles 108, including, but not limited to, trucks, tractor trailers, motorcycles, motorized scooters, and the like are also considered within the scope of vehicles 108.

The roadway 102 can include a multitude of smart roadway studs 110a-110h (referred to collectively as "smart roadway stud 110"). Each roadway stud 110a-110h can be coupled, removably coupled, or otherwise disposed in and/or along the roadway 102. For example, in certain embodiments, each smart roadway stud 110 can have a lower portion that is disposed within or otherwise inserted into the roadway 102 and an upper portion that extends above a top surface of the roadway 102. In another example embodiment, the entirety of each roadway stud can be positioned above the top surface of the roadway 102 and adhered to the roadway 102 via an adhesive, anchors, or other known attachment method.

In certain example embodiments, smart roadway studs 110 can be positioned between each lane 104, 106 of travel, such as with smart roadway studs 110d and 110e. In certain example embodiments, smart roadway studs 110 can be positioned in the center of each lane 104, 106 of travel. These smart roadway studs 110d and 110e can be placed a predetermined distance apart along the direction of travel for the roadway 102. In one example, the predetermined distance can be substantially the same for the entire roadway. Alternatively, the predetermined distance can be a first predetermined distance that is substantially the same for a first set of smart roadway studs 110 communicably coupled to a first stud control system and a second predetermined distance that is different from the first predetermined distance and that is substantially the same for a second set of smart roadway studs 110 communicably coupled to a second stud control system. In another example embodiment, each smart roadway stud 110 can include a global positioning system (GPS) transceiver that can provide an exact position for the particular smart roadway stud 110 along the roadway. Providing smart roadway studs 110 with GPS receivers can reduce the potential distance error that occurs when installing the smart roadway studs 110 on the roadway 102.

In addition, in certain example embodiments, smart roadway studs 110 can be positioned along the outer exterior or boundary or each lane 104, 106. For example, as shown in FIG. 1, smart roadway studs 110a-110c can be positioned along the outer boundary of the roadway lane 104. Further, smart roadway studs 110f-110h can be positioned along the outer boundary of the roadway lane 106. These smart roadway studs 110a-110c and 110f-110h can provide a visual indication of the edge of the roadway 102 and the lack of an additional lane on the other side of the respective smart roadway stud.

In addition, the smart roadway studs 110 can be positioned along the roadway 102 in a manner such that groups of smart roadway studs 110 can be generally positioned along substantially the same travel position along the direction of travel of the roadway 102. For example, as shown in FIG. 1, smart roadway studs 110a, 110d, and 110f are positioned along the same travel position or mileage mark along the roadway 102 and disposed along differing points of the roadway 102. The positioning of the smart roadway studs 110a, 110d, and 110f can be such that when a line is drawn connecting the positions of the three smart roadway studs 110a, 110d, and 110f, that line would be orthogonal or substantially orthogonal to the direction of travel of the roadway 102. Smart roadway studs 110c, 110e, and 110h are similarly shown as being grouped along a particular travel position or mileage mark along the roadway. While the example embodiment of FIG. 1 shows only three smart roadway studs 110 to a group, this is for example purposes only as greater or fewer smart roadway studs can be in each group. In one example embodiment, the number of smart roadway studs 110 that are included in each group across a position of the roadway 102 can be dependent on the number of lanes 104, 106 that are on the roadway. For example, if the roadway has three lanes, it may have anywhere from 2-4 smart roadway studs 110 in a group. If the roadway has four lanes, it may have anywhere from 3-5 smart roadway studs 110 in a group. If the roadway has five lanes, it may have anywhere from 4-6 smart roadway studs 110 in a group. Additional lanes would similarly provide the same corresponding range of possible smart roadways studs 110 in a group. There is no maximum or minimum number of smart roadway studs 110 that must be in a group, regardless of the size of the roadway. In another example embodiment, the smart roadway studs 110 may not be grouped along the same position of the roadway 102.

The operating environment 100 for the example smart roadway stud control system can also include a mounting device 112. The mounting device 112 can be positioned along an outer or inner edge of the roadway 102. Alternatively, the mounting device 112 can be positioned on the roadway 102, such as on a median between roadway lanes having traffic that moves in opposite directions. The mounting device 112 can be a pole and/or cabinet and can be configured to have multiple devices, control boxes, and/or lighting devices attached thereto. The mounting device 112 may also be contained within a traffic signal. As shown in FIG. 1, in one example embodiment, the mounting device 112 can be a roadway lighting pole.

The operating environment 100 for the example smart roadway stud control system can also include a local stud control system 114. In one example, the local stud control system 114 can be coupled to or installed within or along the mounting device 112. The local stud control system 114 can be communicably coupled to multiple smart roadway studs 110 and can be configured to transmit and receive data to and from the smart roadway studs 110 associated with (i.e. communicating with) the particular local stud control system 114. In one example embodiment, multiple local stud control systems 114 can be provided along the roadway 102. Each local stud control system 114 can be configured to manage communications with smart roadway studs 110 along a predetermined length of the roadway 102.

In one example embodiment, the predetermine length is substantially one mile such that about every one mile of roadway 102 a local stud control system 114 can be positioned along the roadway 102 and can control smart roadway studs 110 for substantially one-half mile in the direction of travel of the roadway 102 and substantially one-half mile in the direction opposite the direction of travel of the roadway 102. In example embodiments where the predetermined length is different, the local stud control system 114 can similarly control smart roadway studs 110 for half of that distance along the direction of travel of the roadway and the other half of that distance along the direction opposite the direction of travel of the roadway 102.

In certain example embodiments, the predetermined length may not be the same for all local stud control systems 114. For example, issues such as geography, path of travel of the roadway 102 (e.g., curves, bridges), intersecting roadways, elevation changes, environmental issues (including high levels of other forms of communication in the area that may affect or distort the communications between the local stud control system 114 and the smart roadway studs 110 associated with that system 114), and the like may effect the predetermined length at which the local stud control system 114 can effectively communicate with the smart roadway studs 110 associated with that system 114. As such, the actual length of roadway 102 for which each local stud control system 114 controls smart roadway studs 110 can vary from local stud control system 114 to local stud control system 114.

The number of smart roadway studs 110 that each local stud control system 114 can communicate with can be anywhere in the range of 1-5000 smart roadway studs 110. The number of smart roadway studs 110 that each local stud control system 114 communicates with (i.e. is associated with) can similarly be dependent on a number of factors, including, the number of lanes in the roadway 102 (which can affect the number of smart roadway studs 110 provided across the roadway 102), whether the roadway has traffic moving in opposite directions, geography, path of travel of the roadway 102 (e.g., curves, bridges), intersecting roadways, elevation changes, environmental issues (including high levels of other forms of communication in the area that may affect or distort the communications between the local stud control system 114 and the smart roadway studs 110 associated with that system 114), and the like.

The operating environment 100 for the example smart roadway stud control system can also include a remote stud control system 118. The remote stud control system 118 can be communicably coupled to one or more of the local stud control systems 114. In one example, the remote stud control system 118 can be communicably coupled to the local stud control system via the Internet 120. In addition, or alternatively, the remote stud control system 118 can be communicably coupled to the one or more local stud control systems 114 via a hard wire connection between each of the local stud control systems 114 and the remote stud control system 118, via cellular communication, or via another form of communication known to those of ordinary skill in the art.

In one example, the remote stud control system 118 can send and receive data and instructions to multiple local stud control systems 114 simultaneously or substantially simultaneously. For example, the remote stud control system 118 can receive data from and transmit smart road stud control signals to a number of local stud control systems 114 in the range of 1-5000 systems. In one example, the remote stud control system 118 can include a server or mainframe type computing system specifically designed for smart road stud control and traffic management.

Figure 2A:
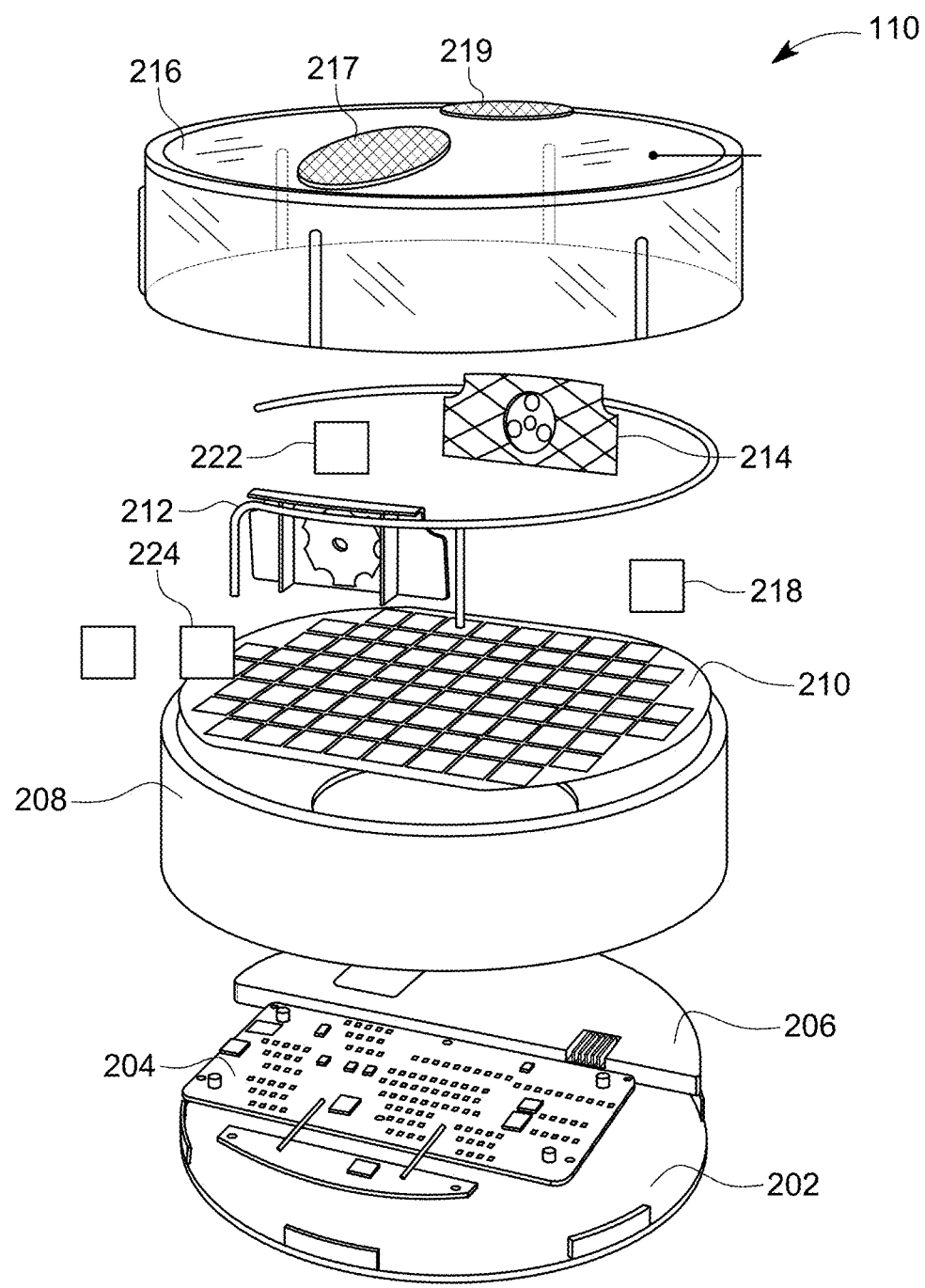
FIG. 2A is an exploded view of a smart roadway stud, according to one or more embodiments of the presently disclosed subject matter.
Figure 2B:
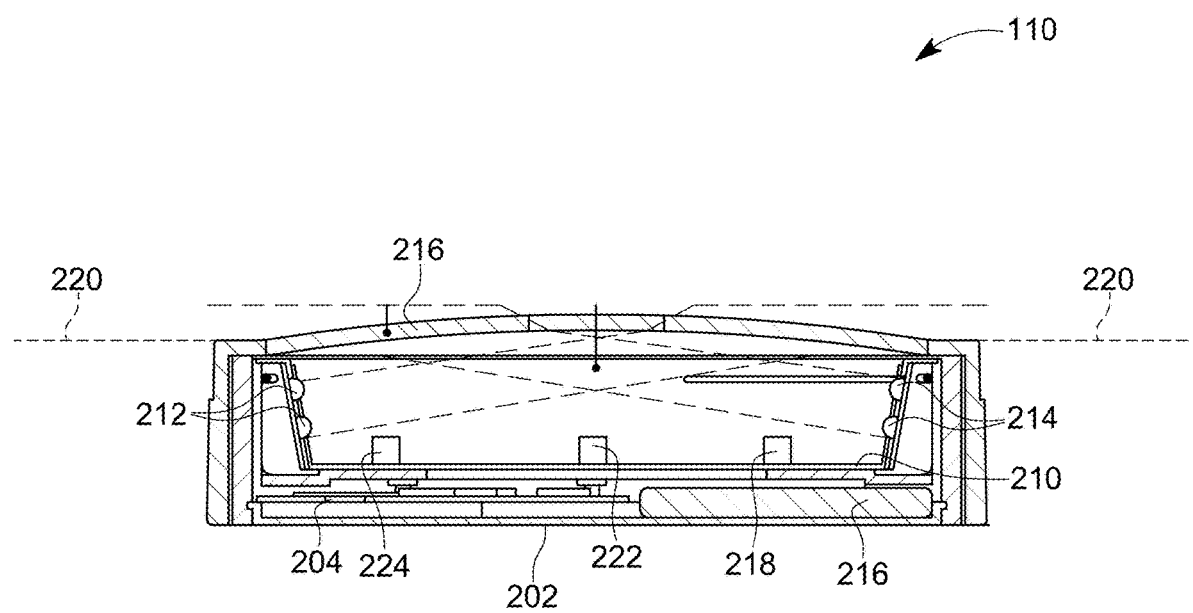
FIG. 2B is a side elevation view of the smart roadway stud of FIG. 2A, according to one or more embodiments of the presently disclosed subject matter.

FIG. 2A is an exploded view of a smart roadway stud 110, in accordance with one example embodiment of the disclosure. FIG. 2B is a side elevation view of the smart roadway stud 110 of FIG. 2A, in accordance with one example embodiment of the disclosure. Referring now to FIGS. 1, 2A, and 2B, the example smart roadway stud 110 can be a surface mounted stud that is positioned along the top surface 220 of the roadway 102 or an embedded stud that includes a portion of the stud being embedded into the roadway 102 and another portion of the stud that extends up above the top surface 220 of the roadway 102.

The example smart roadway stud 110 can include a housing bottom 202 and a housing top 208. In certain example embodiments, the housing bottom 202 can include a flat or substantially flat top surface and the housing top 208 can include a flat or substantially flat top surface. The housing bottom 202 and housing top 208 can be coupled, removably coupled, rotatably coupled, threadably coupled, and/or fixedly coupled to one another. In one example, the housing bottom 202 can include one or more tabs and the housing top 208 can include one or more slots. Each slot in the housing top 208 can be configured to receive one of the tabs from the housing bottom 202 to mate the housing top 208 with the housing bottom 202. The housing top 208 and housing bottom 202 can be constructed of plastic (e.g., polycarbonate), polymers (e.g., Acrylonitrile Butadiene Styrene (ABS)), metal (e.g., aluminum, steel, or iron), an alloy, graphene, and/or any other substance known or used in the art. In one example, the housing top 208 and housing bottom 202 when coupled are IP 68 rated in that they are dust tight and protected against complete, continuous submersion in water and is resistant to condensation inside an internal cavity defined by the housing top 208 and housing bottom 202.

The smart roadway stud 110 can further include one or more processors 204. In one example, the one or more processor 204 can be disposed within the internal cavity defined by the housing top 208 and the housing bottom 202 and along the top surface of the housing bottom 202. In another example embodiment, the one or more processors can be positioned along another portion of the smart road stud 110. The one or more processor 204 can be any type of computer processor. In some examples, the one or more processors 204 of the smart road stud 110 may be implemented, as appropriate, in hardware, software, firmware, or combinations thereof. Software or firmware implementations of the one or more processors 204 may include computer-executable or machine-executable instructions written in any suitable programming language to perform the various functions described. Hardware implementations of the one or more processors 204 may be configured to execute computer-executable or machine-executable instructions to perform the various functions described. The one or more processors 204 may include, without limitation, a central processing unit (CPU), a digital signal processor (DSP), a reduced instruction set computer (RISC), a complex instruction set computer (CISC), a System-on-a-Chip (SoC), a microprocessor, a microcontroller, a field programmable gate array (FPGA), or any combination thereof. The smart road stud 110 may also include a chipset (not shown) for controlling communications between the one or more processors 204 and one or more of the other components of the smart road stud 110 and or the local stud control system 114. The one or more processors 204 may also include one or more application specific integrated circuits (ASICs), a System-on-a-Chip (SoC), or application specific standard products (ASSPs) for handling specific data processing functions or tasks.

The one or more processors 204 can be configured to communicate wirelessly with the local stud control system 114 that the particular smart road stud 110 is associated with. The processor 204 may include a radio and/or transceiver to conduct its wireless communication with the local stud control system 114. The one or more processors 204 can be configured to communicate in any currently known or future developed communication protocol, including, but not limited to, DASH7, Zigbee, Bluetooth, Wi-Fi, Sigfox, DSRC, or a low-power wide area network (WAN) such as LoRaWAN.

The smart road stud 110 can also include a battery 206 electrically coupled to the one or more processors 204. In one example, the battery 206 can be disposed within the inner cavity defined by the housing top 208 and housing bottom 202 and along the top surface of the housing bottom 208. In another example embodiment, the battery 206 can be positioned along another portion of the smart road stud 110. The battery 206 can be a rechargeable battery. In one example embodiment, the battery 206, when fully charged, is configured to power the electrical components of the smart road stud 110 for at least 24 hours and more preferably at least 48 hours, and even more preferably at least 96 hours and even more preferably at least one week. In certain example embodiments, the battery 206 is electrically coupled to one or more solar panels 210. The battery 206 can be configured to receive electrical energy generated by the solar panel 210 for the purposes of recharging the battery 206.

In certain example embodiments, the battery 206 is configured to handle peak energy flow from the solar panel 210. In one example, the peak energy flow from the solar panel 210 to the battery 206 can be 18 Watts per hour with a peak power level of 1.5 Watts. In another example embodiment, the peak energy flow from the solar panel 210 to the battery 206 can be up to 100 Watts per hour with a peak power level of up to 10 Watts. The battery 206 can have a low self-discharge rate. Having a low self-discharge rate will help ensure that the battery 206 does not lose/leak power if the light emitting functionality of the smart road stud 110 is in standby mode for long periods of time. In addition, the rechargeable battery 206 can be configured to have a cycle life of at least 1000 charge-discharge cycles and more preferably 3000 charge-discharge cycles, and even more preferably 10,000 charge-discharge cycles. In general, the rechargeable battery 206 can be configured to maximize the cycle life. The battery 206 can be any kind of battery now known or hereafter developed, including, but not limited to, any one of a nickel metal hydride battery, absorbent glass mat (AGL) lead acid battery, graphene-based battery, and lithium-based (e.g., lithium ion) battery. In one example, the battery 206 is a nickel metal hydride or lithium ion battery.

Battery life can be determined by several parameters including power consumption, recharge capacity, battery capacity, and actual battery life. Power consumption can be partly determined by factoring the number of cars per mile, car speed, and number of lanes of the roadway. The type of LEDs and intensity of the LEDs is also important for determining power consumption. According to one embodiment of the presently disclosed subject matter, the average power consumption calculated resulted in about 4 WHr per day.

Recharge capacity is based on the physical area of the solar panel 210 as well as a technology of solar energy available. According to one embodiment of the presently disclosed subject matter, the average power available resulted in a solar panel need of at least 8000 $mm^2$. This generated more than 4 WHr per day. This is based on a day that could be termed as "mostly sunny".

Battery capacity is based on battery size and type. In one example embodiment, the two types of battery technologies used are Nickel-Metal-Hydride (NiMH) and Lithium. Lithium has a slightly higher power density than the NIMH. One type of battery that may be used is an AA NiMH cell. Using this type of battery, it would require 2 cells and result in a total battery capacity of 10 WHr. Another type of battery that may be used is a standard cell Lithium. This type of battery requires 1 cell and has a capacity of 9.5 WHr. The smallest or thinnest battery type is a Lithium pack. A Lithium pack could have a capacity of 9-10 WHr. According to one embodiment, this means that the stud 110 could operate for approximately 2 days without a charge. Additionally, for an average day, the batteries would get fully recharged every day.

According to one embodiment, battery life is subject to two parameters, temperature and charge cycles. An ideal battery can operate over a range of extreme temperatures and has the ability to re-charge multiple times over and over. NiMH has better temperature tolerance because of its chemistry. NiMH operation at low temperatures is slightly reduced. Special chemistry Lithium batteries exist that have better temperature characteristics than a normal Lithium cell but at a cost increase. In both cases the battery life is temporarily reduced during the low temperature time but recovers as temperature increases. NiMH has better charge cycle life. Methods of increasing recharge cycle capability for Lithium batteries exist in the art. Any battery known or used in the art may be used.

The battery 206 can have any shape and size. In one example, the battery 206 is sized and shaped to fit within the inner cavity defined by the housing top 208 and the housing bottom 202 along with the processor 204. The battery 206 can also be electrically coupled to the processor 204, the light emitting diode (LED) illumination panels 212, 214, and the one or more sensors 218, 222, 224 to provide electrical power to each as needed.

The smart road stud 110 can also include one or more solar panels 210. In one example, the one or more solar panels 210 can be arranged along the top surface of the housing top 208. The solar panels 210 can be electrically coupled to the battery 206. In addition, the one or more solar panels 210 can be electrically coupled to the one or more processors 204, the LED illumination panels 212, 214, and/or the one or more sensors 218, 222, 224. In this manner, the one or more solar panels 210 may be able to simultaneously power the one or more processors 204, the LED illumination panels 212, 214, and/or the one or more sensors 218, 222, 224, while also providing a recharge to the battery 206 or providing power to the one or more processors 204, the LED illumination panels 212, 214, and/or the one or more sensors 218, 222, 224 after fully recharging the battery 206 such that electrical energy from the battery 206 might only be used when the one or more solar panels 210 are not receiving sufficient solar energy to generate electrical energy.

In one example embodiment, the solar panel 210 is a substantially 10 centimeter by substantially 10 centimeter polycrystalline/monocrystalline solar panel. However, other shapes, sizes, and types of solar panels may be used in accordance with the example embodiment of the disclosure. For example, it may be beneficial to maximize the upper surface area of the solar panel 210 to generate as much solar energy as possible. As such, the size and shape of the solar panel 210 can be dependent on the size and shape of the portion of the smart road stud 110 that is capable of receiving sunlight.

The smart road stud can further include one or more LED panels 212, 214. While the example embodiment of FIG. 2A shows two LED panels, the number can be one or greater than two depending on the desired use of the road stud and the positioning of each of the LEDs. Two LED panels 212, 214 may be provided in order that light emitted from smart road stud 110 can be emitted both in the direction of travel along the roadway 102 and in the direction opposite travel along the roadway 102.

Each LED panel 212, 214 can include at least one LED and preferably more than one LED or LED array. For example, each LED panel 212, 214 can include a printed circuit board (PCB) with multiple LEDs electrically coupled to the PCB. In one example embodiment, the multiple LEDs on each PCB for the particular LED panel 212, 214 can include at least one LED that emits red light, at least one LED that emits green light, and at least one LED that emits blue light. In other example embodiments, the LEDs or LED array provided on the PCB may only include LEDs that emit one, two, or more than three colors of light. The smart road stud 110 can also include one or more reflectors (not shown) to help direct the light emitted from each of the LED panels 212, 214. In addition, the one or more reflectors can be configured to mix the light being emitted by the one or more LED panels 212, 214 to provide an emitted light color that is different from the original light being emitted by each discreet LED.

Each LED panel 212, 214 can be electrically coupled to the battery 206 and communicably coupled to the one or more processors 204. In addition, each LED panel 212, 214 may be electrically coupled to the one or more solar panels 210. Through the use of reflectors and other optical components known to those of ordinary skill in the art, each LED panel 212, 214 can emit LED light with a beam spread of anywhere between 0.1-90 degrees and preferably a beam spread of anywhere between 5-60 degrees and even more preferably a beam spread of anywhere between 10-45 degrees. The LED panels 212, 214 may be configured to emit a constant beam of light or to flash the LEDs on the respective panel 212, 214 on and off. Flashing the LEDs on and off can extend battery life for the battery 206 by reducing the amount of energy used by the LED panels 212, 214. The LED panels 212, 214 may also be configured to emit light at high energy levels for short periods of time in order to appear less bright and conserve battery life. Multiple colors may be included within a single LED diode in order to emit a color of light different from the multiple colors included within the single LED diode.

The smart road stud 110 can also include a vehicle sensor 218. The vehicle sensor 218 can be configured to sense and determine when a vehicle passes by and/or over the smart road stud 110. In one example, the vehicle sensor 218 is a magnetic sensor 218. Alternatively, the vehicle sensor 218 can be an inductive loop detector, an active or passive infrared detector, or an acoustic sensor. The vehicle sensor 218 can be any sensor known or used in the art. In one example, the magnetic sensor 218 is an Anisotropic Magneto-Resistive (AMR) magnetic sensor. The magnetic sensor 218 can be communicably coupled to the one or more processors 204 and electrically coupled to the battery 206 and optionally the one or more solar panels 210. The magnetic sensor 218 can be a multi-axis magnetic sensor that can determine the direction of travel of the vehicle and the lane of travel of the vehicle to be determined based on data from the magnetic sensor 218.

Measurements (e.g., event data) taken by the magnetic sensor 218 can be used to determine the size, position in lane, and the velocity of the vehicle 108 passing by the smart road stud 110 (e.g., 110f). When the same vehicle 108 is observed by the next smart road stud 110 (e.g., 110g) in the direction of travel along the roadway 102, the vehicle's velocity can be definitively calculated based on the signal provided by each of the smart road studs 110f and 110g, the time between the two signals and the known distance between road stud 110f and 110g.

In addition, having smart road studs grouped across the roadway orthogonal to the direction of travel allows for better determination of the position of each vehicle 108. For example, as the vehicle 108 drives down the lane 106 between smart road studs 110f and 110d, each of smart road studs 110f and 110d will provide a complementary or substantially complementary event data.

The event data collected by the magnetic sensor 218 can be passed to the one or more processors 204. The one or more processors can conduct initial analysis on the event data to generate an event vector for the vehicle 108. The event vector can include the event duration, the event magnitude, and the event orientation. A time stamp and smart road stud identifier (a unique identifier string that designates the smart road stud different from other smart road studs) can be included with the event vector data so that elements such as vehicle speed can be calculated based on the event vector data and the distance between corresponding smart road studs (determined at least in part based on the smart road stud identifier). This event vector data can then be transmitted from the smart road stud 110 to the local stud control system 114 associated with the particular smart road stud 110.

The smart road stud 110 can also include a temperature sensor 222. In one example, the temperature sensor 222 can be positioned along or above the top surface of the housing top 208. The temperature sensor 222 can be communicably coupled to the one or more processors 204 and electrically coupled to the battery 206 and optionally the one or more solar panels 210. The temperature sensor 222 can be configured to measure a temperature in the smart road stud 110 and adjacent to the top surface 220 of the roadway 102. The temperature sensor 222 can electrically transmit that temperature data to the one or more processors 204. In one example, the temperature sensor 222 can measure a first temperature and can transmit the first temperature data to the one or more processors 204. The one or more processors 204 can compare the first temperature data, as measured by the temperature sensor 222, to a first temperature threshold parameter to determine if the first temperature data is less than or less than or equal to the first temperature threshold parameter. The one or more processors 204 may also be configured to account for humidity and wind chill conditions adjacent to the top surface 220 of the roadway 102 based on data received from the temperature sensor 222. In one example, the first temperature threshold parameter is 32 degrees Fahrenheit (0 degrees Celsius). If so, the one or more processors 204 can determine that the roadway 102 is susceptible to freezing and/or ice build-up and can transmit a signal to the one or more LED panels 212, 214 to turn on or otherwise change to emit light of a first color. In one example embodiment, that first color is blue, however other colors, such as white or any other color may be emitted.

Additional temperature threshold parameters can be provided, such as at temperatures lower than the first temperature threshold parameter, and as subsequent temperature data received from the temperature sensor 222 is determined to be below these lower temperature threshold parameters, the color emitted by the LED panels 212, 214 can be further adjusted to different colors or to darker shades of the first color. For example, as the temperature falls further below 32 degrees Fahrenheit and passes additional temperature threshold parameters, the color emitted by the LED panels 212, 214 can be changed from a lighter shade of blue to a darker shade of blue or from blue to white. The exact color changes are given for example only as any other color change or shade change can be made based on the temperature analysis being conducted. For example, the duration for which a color is emitted may vary based on additional temperature threshold parameters. While in this example, the data comparison to the first temperature threshold parameter is conducted at the processor 204 of the smart road stud 110, in other example embodiments, the one or more processors 204 can wirelessly transmit the first temperature data to the local stud control system 114 which can conduct the evaluation there or further send the first temperature data to the remote stud control system 118 to conduct the evaluation.

While not shown, the smart road stud 110 can also include a humidity sensor. In one example, the humidity sensor can be positioned along or above the top surface of the housing top 208. The humidity sensor can be communicably coupled to the one or more processors 204 and electrically coupled to the battery 206 and optionally to the one or more solar panels 210. The humidity sensor can be configured to measure the ambient humidity of the environment around the smart road stud 110. In one example, evaluating the humidity data in conjunction with the temperature data provided by the temperature sensor 222 can provide a more accurate determination as to whether the roadway 102 is likely to have or may soon have ice. The combination of the information from the humidity sensor and the temperature sensor 222 can be used similar to that described above with regard to the temperature sensor 222 and the illumination of the LED panels 212, 214. For example, in one method, if both the temperature data is less than the first temperature threshold parameter and the humidity data reflects a humidity that is greater than the first humidity threshold parameter, then the one or more processors 204 can determine that the roadway 102 is susceptible to freezing and/or ice build-up and can transmit a signal to the one or more LED panels 212, 214 to turn on or otherwise change to emit light of a first color. As described above, the determination could alternately occur at the local stud control system 114 or the remote stud control system 118 in other example embodiments.

The smart road stud 110 can also include a photosensor 224. In one example, the photosensor 224 can be positioned along or above the top surface of the housing top 208. The photosensor 224 can be communicably coupled to the one or more processors 204 and electrically coupled to the battery 206 and optionally the one or more solar panels 210. The photosensor 224 can be configured to measure the amount of ambient light (i.e., light level data) received into the smart road stud 110 from the surrounding environment adjacent to the top surface 220 of the roadway 102. The photosensor 224 can electrically transmit that light level data to the one or more processors 204. In one example, the photosensor 224 can measure ambient light levels in order to determine how bright the LED light emitted by the LED panels 212, 214 needs to be. For example, on a sunny day, the photosensor 214 may read a high light level. This will signal that a brighter light level needs to be emitted from the LED panels 212, 214 in order for that light to be viewable by the driver of a vehicle 108. Based on that, additional power can be provided to the LED panels 212, 214 to increase the lumen output of the LEDs (when in operation).

In addition, the photosensor 224, either alone or in conjunction with another sensor (e.g., a humidity sensor and/or a laser diode and back-scatter detector either at the smart road stud 110 or at the local stud control system 114) can be configured to detect fog, smoke, heavy rain, or other environmental situations that obscure the view on the roadway 102. The data from the photosensor 224 can be electronically transmitted to the one or more processors 204. The one or more processors 204 can determine the likelihood of smoke, fog, or another environmental situation (e.g. rain, snow) that obscures the view of the roadway 102. In response, the one or more processors 204 can transmit a signal to the LED panels 212, 214 to increase the power level to the LED panels 212, 214 so that the brightness of the LED light emitted by the LED panels is increased to provide a better opportunity for drivers to see the smart roadway studs 110 and thus the lanes and boundaries of the roadway 102. While the example above describes the determination of fog, smoke, or other environmental situations being made at the one or more processors 204, in other example embodiments, the determination can be made at the local stud control system 114 and/or at the remote stud control system 118 based on data being wirelessly transmitted to the local stud control system 114 by the smart road stud 110. While the example embodiment of the smart road stud 110 is shown and described with a vehicle sensor 218, temperature sensor 222, humidity sensor, and photosensor 224, any other type of sensor may also be included in the smart road stud 110.

The smart road stud 110 can also include a lens cover 216. The lens cover 216 can be fixedly or removably coupled to the housing top 208 and/or the housing bottom 202. The lens cover 216 can include a top surface and one or more side surfaces that extend generally downward from the top surface. In one example, the lens cover 216 can be transparent or partially transparent. For example, the top surface of the lens cover 216 may be transparent while the one or more side surfaces may be translucent or opaque. In one example, the lens cover 216 can be constructed of polycarbonate or another form of plastic or transparent material.

At least a portion of the lens cover 216 (e.g., the top surface) is configured to extend above the top surface 220 of the roadway 102 when the smart road stud 110 is installed on the roadway 102. The transparent nature of the top surface allows for sunlight to be received through the top surface to provide solar power to the one or more solar panels 210 and to allow light emitted by the LEDs on the LED panels 212, 214 to exit the smart road stud 110 and be viewed in an area adjacent the smart road stud 110 along the roadway 102. In one example embodiment, the lens cover 216 can also include one or more light focusing elements 217, 219 for focusing and/or dispersing light. The light focusing elements 217, 219 for focusing and/or dispersing light can be positioned along the top surface of the lens cover 216 and positioned to align with the light output of the LEDs from each of the LED panels 212, 214. The light focusing elements 217, 219 can be any type of lens for focusing and/or dispersing light including, but not limited to, concave, convex, combination, Fresnel, cylindrical, and the like.

Figure 3:
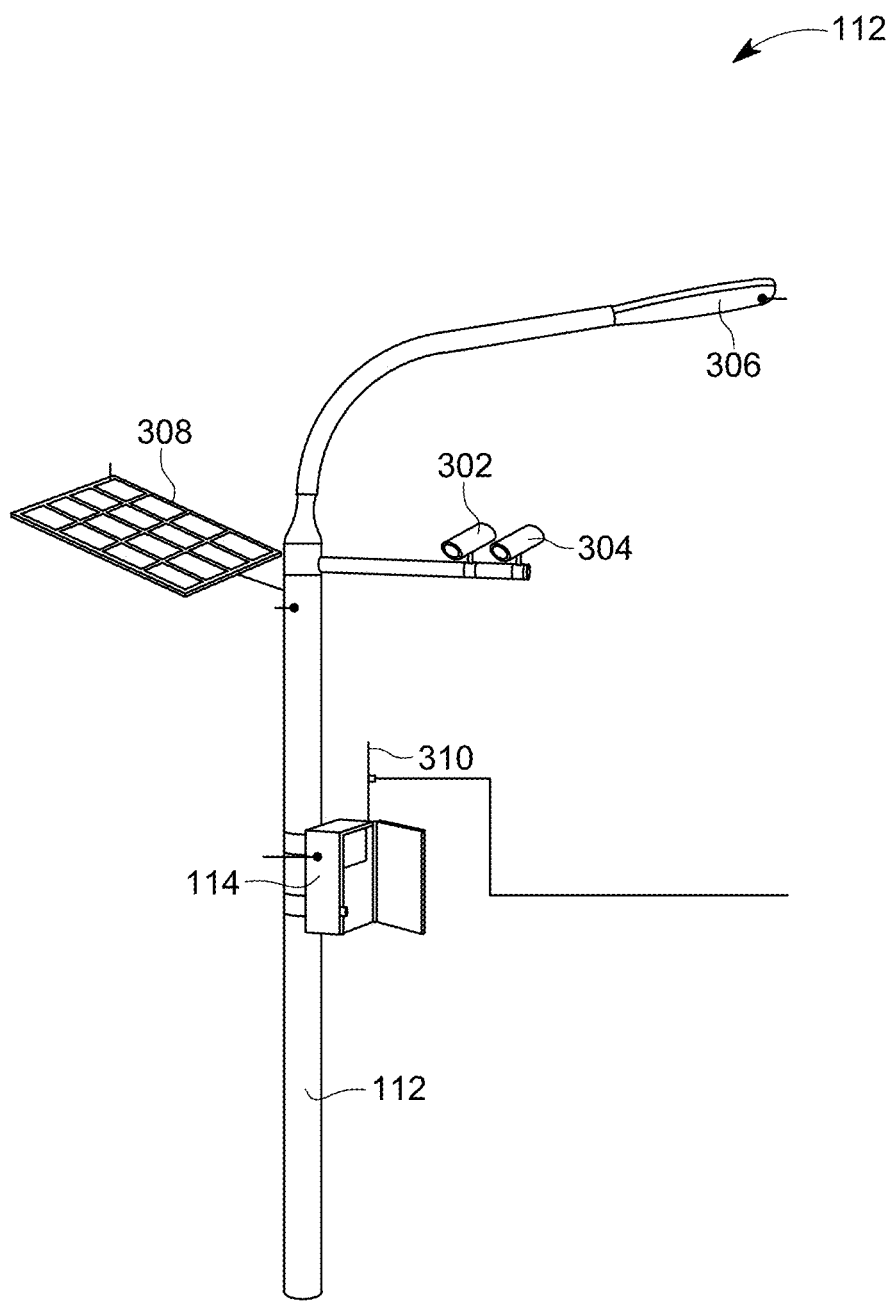
FIG. 3 is a side elevation view of a smart stud control system for controlling one or multiple smart roadway studs, according to one or more embodiments of the presently disclosed subject matter.

FIG. 3 is a side elevation view of a mounting device 112 and local smart stud control system for controlling one or multiple smart roadway studs 110, in accordance with one example embodiment of the disclosure. Referring now to FIGS. 1-3, the local smart stud control system can include a mounting device 112. The mounting device 112 can be positioned along an outer or inner edge of the roadway 102. Alternatively, the mounting device 112 can be positioned on the roadway 102, such as on a median between roadway lanes having traffic that moves in opposite directions or coupled to framing and suspended above the roadway 102. The mounting device 112 can be a pole and/or cabinet and can be configured to have multiple devices, control boxes, and/or lighting devices attached thereto. As shown in FIG. 1, in one example embodiment, the mounting device 112 can be a roadway lighting pole.

Figure 4:
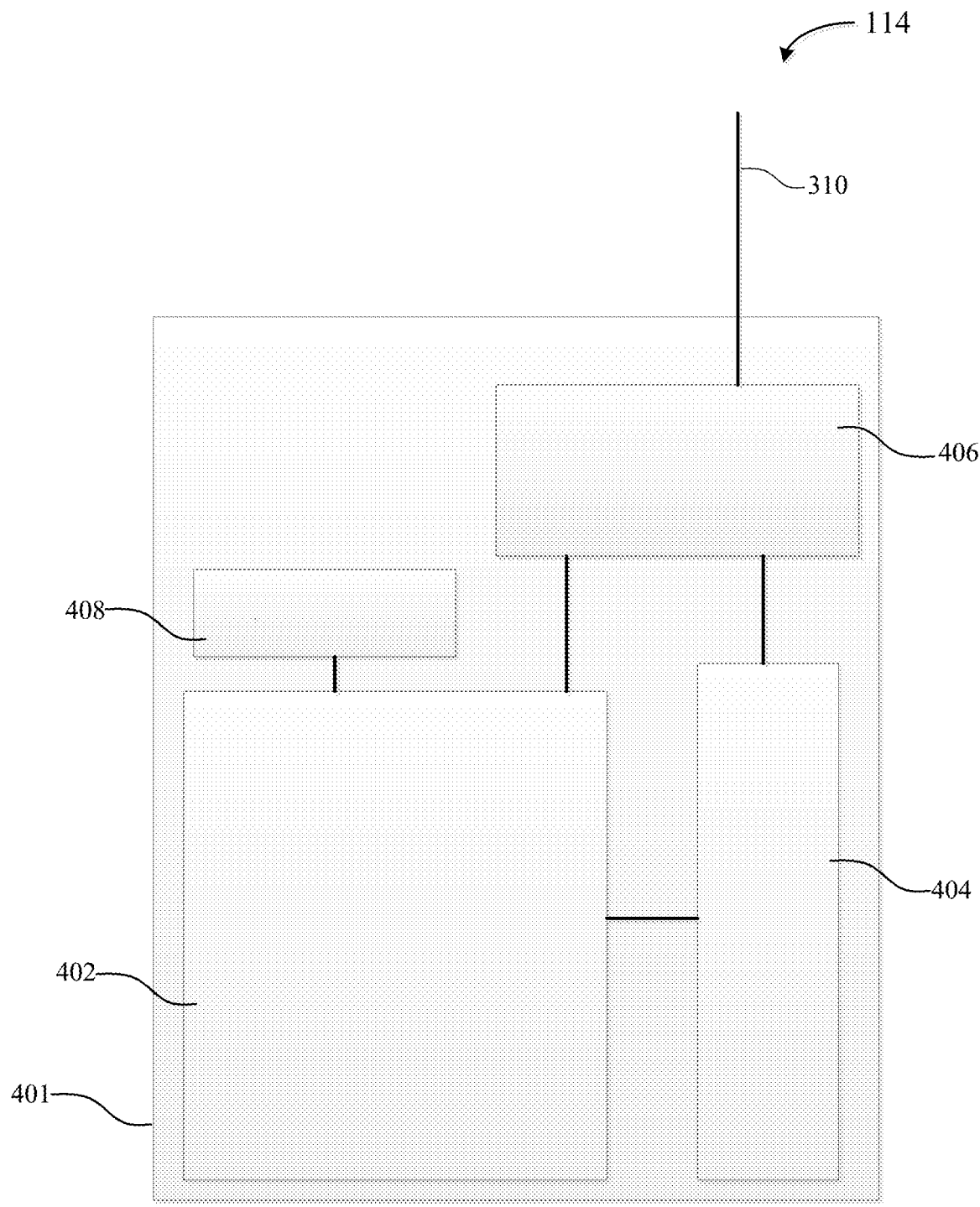
FIG. 4 is a simplified graphical view of a smart stud control box for the smart stud control system of FIG. 3, according to one or more embodiments of the presently disclosed subject matter.

The local smart stud control system can also include a local stud control system 114. In one example, the local stud control system 114 can be coupled to or installed within or along the mounting device 112. FIG. 4 is a simplified graphical view of a smart stud control box for the local stud control system 114 of FIG. 3, in accordance with one example embodiment of the disclosure. Referring to FIGS. 1-4, the smart stud control box 401 for the local stud control system 114 can include a smart stud control box 401. In one example, the smart stud control box 401 can be an electrical or computer cabinet or other cavity for receiving the other elements of the smart stud control box 401.

The local stud control system 114 can also include one or more processors 402. In one example, the one or more processor 402 can be disposed within the smart stud control box 401. The one or more processor 402 can be any type of computer processor. In some examples, the one or more processors 402 may be implemented, as appropriate, in hardware, software, firmware, or combinations thereof. Software or firmware implementations of the one or more processors 402 may include computer-executable or machine-executable instructions written in any suitable programming language to perform the various functions described. Hardware implementations of the one or more processors 402 may be configured to execute computer-executable or machine-executable instructions to perform the various functions described. The one or more processors 402 may include, without limitation, a central processing unit (CPU), a digital signal processor (DSP), a reduced instruction set computer (RISC), a complex instruction set computer (CISC), a System-on-a-Chip (SoC), a microprocessor, a microcontroller, a field programmable gate array (FPGA), or any combination thereof. The local stud control system 114 may also include a chipset or network interface controller 408 communicably coupled to the one or more processors 402. In one example, the network interface controller 408 can control communications between the one or more processors 402 and one or more of the other components of the local smart stud control system and/or one or more of the smart road studs 110 associated with the local stud control system 114. The one or more processors 402 may also include one or more application specific integrated circuits (ASICs), a System-on-a-Chip (SoC), or application specific standard products (ASSPs) for handling specific data processing functions or tasks.

The one or more processors 402 can be configured to communicate wirelessly with the smart road studs 110 associated with the local stud control system 114 and the remote stud control system 118, if one is optionally included. For example, the local stud control system 114 may include a radio and/or transceiver 406 communicably coupled to the one or more processors 402 and an antenna 310 and electrically coupled to a battery 404 to conduct its wireless communication with the smart road studs 110 associated with the particular local stud control system 114 and the remote stud control system 118. The one or more processors 402 can be configured to communicate in any currently known or future developed communication protocol, including, but not limited to, cellular (e.g., Global System for Mobile Communication ("GSM")), Dash7, DSRC, Zigbee, Bluetooth, Wi-Fi, Sigfox, or a low-power wide area network (WAN) such as LoRaWAN.

The local stud control system 114 can also include a battery 404 electrically coupled to the one or more processors 402 and the radio or transceiver 406. In one example, the battery 404 can be disposed within the smart stud control box 401. The battery 404 can be a rechargeable battery. In one example embodiment, the battery 404, when fully charged, is configured to power the electrical components of the local smart stud control system, including the local stud control system 114 for at least 24 hours and more preferably at least 48 hours, and even more preferably at least 96 hours and even more preferably at least one week. In another example embodiment, the battery can be supplemented with or replaced by hard-wiring the local smart stud control system into the electrical power grid. The battery 404 could still be useful, however, during power outages and disruptions of the electrical power grid.

In certain example embodiments, the battery 404 is electrically coupled to one or more solar panels 308. The battery 404 can be configured to receive electrical energy generated by the solar panel 308 for the purposes of recharging the battery 404. In certain example embodiments, the battery 404 is configured to handle peak energy flow from the solar panel 308. The battery 404 can have a low self-discharge rate. In addition, the rechargeable battery 404 can be configured to have a cycle life of at least 1000 charge-discharge cycles and more preferably 3000 charge-discharge cycles, and even more preferably 10,000 charge-discharge cycles. The battery 404 can be any kind of battery now known or hereafter developed, including, but not limited to, any one of a nickel metal hydride battery, absorbent glass mat (AGL) lead acid battery, graphene-based battery, or lithium-based (e.g., lithium ion) battery. In one example, the battery 404 is a nickel metal hydride or lithium ion battery that has sufficient electrical storage in a single cycle to provide at least 2 kilowatt hours (kWh), 4 kWh, or 10 kWh of electrical power.

The battery 404 can have any shape and size. In one example, the battery 404 is sized and shaped to fit within the smart stud control box 401 along with the one or more processors 402 and other components. In another example embodiment, the battery 404 can be positioned along or within another portion of the mounting device 112. For example, the battery 404 could be positioned within a cavity near the base of the mounting device 112 to allow for the use of a larger battery 404 having a greater capacity.

The local smart stud control system can also include one or more solar panels 308. In one example, the one or more solar panels 308 can be positioned near the mounting device, such as along the ground area near (e.g. within 50 yards) the mounting device 112. In another example embodiment, the one or more solar panels 308 can be coupled to the mounting device 112. The solar panels 308 can be electrically coupled to the battery 404. In addition, the one or more solar panels 308 can be electrically coupled to the one or more processors 402, the network interface controller 408, the radio or transceiver 406, the Doppler radar detector 302 and/or the camera 304. In this manner, the one or more solar panels 308 may be able to simultaneously power the one or more processors 402, the network interface controller 408, the radio or transceiver 406, the Doppler radar detector 302 and/or the camera 304, while also providing a recharge to the battery 404 or providing power to the one or more processors 402, the network interface controller 408, the radio or transceiver 406, the Doppler radar detector 302 and/or the camera 304 after fully recharging the battery 404 such that electrical energy from the battery 404 might only be used when the one or more solar panels 308 are not receiving sufficient solar energy to generate electrical energy. The one or more solar panels 308 can have any shape and size and can be specifically configured to provide sufficient power to the local smart stud control system in accordance with the example embodiment of the disclosure.

The local smart stud control system can also include one or more Doppler radar detectors 302. Each Doppler radar detector 302 can be communicably coupled to the one or more processors 402 and electrically coupled to the battery 404 and optionally the one or more solar panels 308. Each Doppler radar detector 302 can be configured to detect the velocity or speed of the one or more vehicle 108 on the roadway 102. Each Doppler radar detector 302 can then transmit that speed data to the one or more processor 402. Analysis of the vehicle speed may then occur either at the one or more processors 402 or the local stud control system 114 can wirelessly transmit the speed data to the remote stud control system 118 for analysis at that point.

The local smart stud control system can also include one or more video cameras 304. Each of the one or more video cameras can be communicably coupled to the one or more processors 402 and electrically coupled to the battery 404 and optionally the one or more solar panels 308. Each of the one or more video cameras 304 can be configured to collect video images of vehicles 108 on the roadway 102 and may provide further vehicle identification capability through license plate display and recognition for each vehicle 108 for which video data is recorded. The video data can be transmitted to the one or more processors 402 for analysis along with or separately from the speed data received from the one or more Doppler radar detectors. Alternatively, the local stud control system 114 can wirelessly transmit the video data to the remote stud control system 118 for analysis at that point.

While the example local smart stud control system shows a video camera 304 and radar detector 302, other sensors can be incorporated into the local smart stud control system, including, but not limited to, visibility detectors, weather detectors, temperature sensors, traffic capacity detectors and other forms of sensors and detectors for road condition and traffic evaluation. Each of these other types of sensors and detectors can be communicably coupled to the one or more processors 402 and can be electrically coupled to the battery 404 and optionally to the one or more solar panels 308 for electrical power needs.

The mounting device 112 can also include a luminaire 306 positioned along the mounting device 112. In one example, the luminaire 306 is a street light that is positioned along the mounting device 112 near the highest elevation of the mounting device 112. The luminaire can include any type of light source desired by the particular user, including, but not limited to, LEDs, high intensity discharge (HID) lighting, high pressure sodium (HPS) lighting, halogen lighting, and metal halide. In one particular example, the luminaire 306 includes an LED light source. Providing the luminaire 306 with an LED light source increases the lumen/watt efficiency of the luminaire 306. The luminaire 306 can be electrically coupled to the battery 404 and optionally the one or more solar panels 308 to provide electrical energy to the luminaire. In addition, the luminaire 306 can be communicably coupled to the one or more processors 402, which can control activation and deactivation of the luminaire 306.

In addition, activation and deactivation of the luminaire 306 can be controlled by the remote stud control system 118. For example, the system may be set up in a manner that the luminaire 306 is only activated when a vehicle 108 is within a predetermined distance of the mounting device 112. For example, during the night, smart road studs 110 associated with another local smart stud control system (e.g., an adjacent local smart stud control system) can identify a vehicle 108 on the roadway 102 and can wirelessly transmit a signal to the processor of its local stud control system. The particular local stud control system can then either wirelessly transmit that data to the remote stud control system 118 or directly to the adjacent local smart stud control system. This data can be interpreted as a vehicle 108 approaching the mounting device 112 and local stud control system 114. The one or more processors 402 can generate and transmit a signal to the luminaire 306 to activate. Once the smart road studs 110 associated with the local stud control system 114 determine that the vehicle 108 has passed the mounting device 112 either by a predetermined distance or for a predetermined amount of time, the one or more processors 402 can generate and transmit a signal to the luminaire 306 to deactivate. This process can reduce the power consumption of the luminaire 306 on the local smart stud control system.

The mounting device 112 can also include a photosensor (not shown) communicably coupled to the one or more processors 402 and/or the luminaire 306. The photosensor can provide ambient light level data at the mounting device 112, which can be used to determine if the luminaire 306 should be activated.

Figure 5:
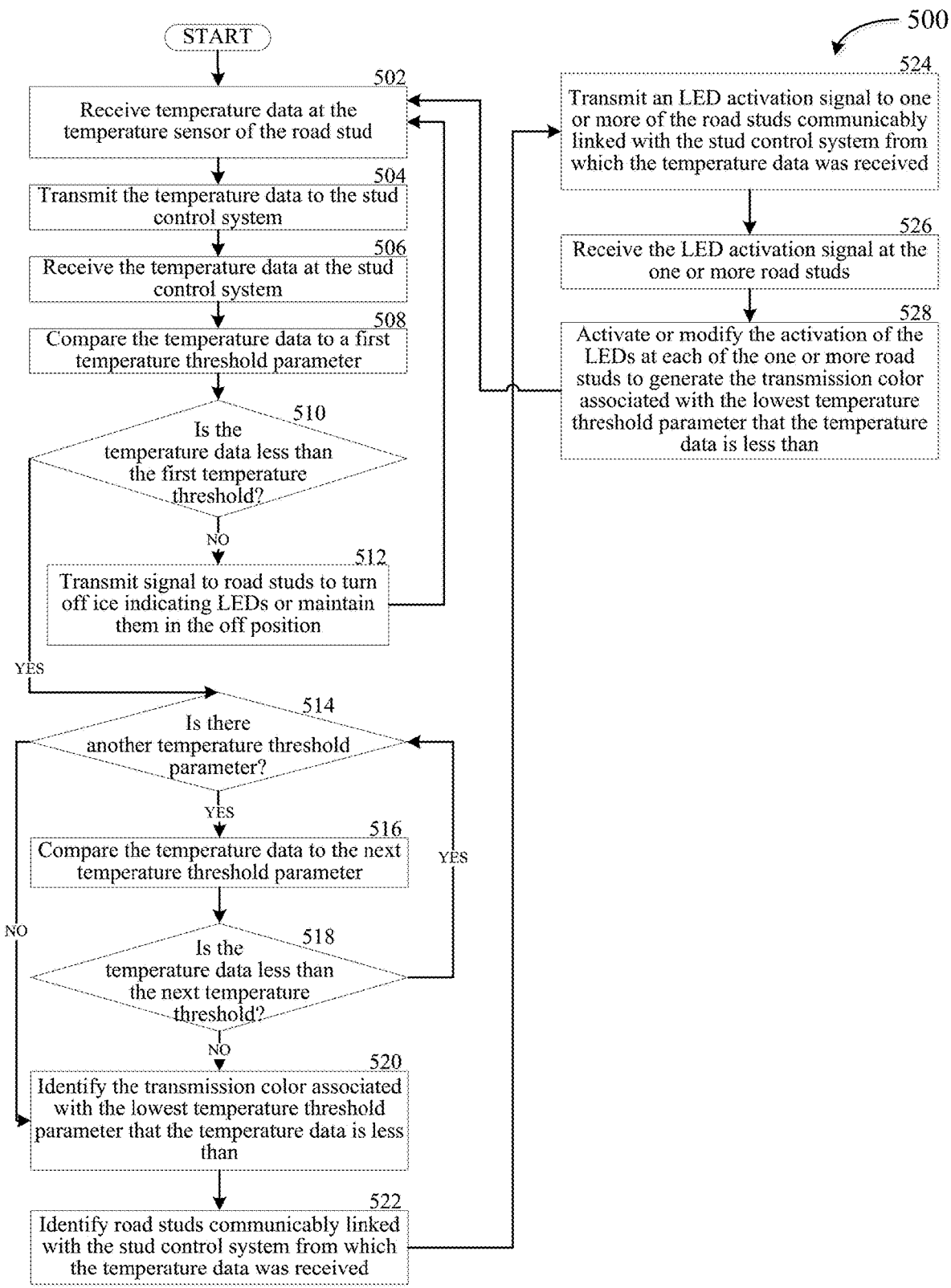
FIG. 5 is a flow chart illustrating a method for determining and signaling the potential for ice or moisture on a roadway with the smart roadway stud, according to one or more embodiments of the presently disclosed subject matter.

FIG. 5 is a flow chart illustrating an example method 500 for determining and signaling the potential for ice or moisture on a roadway with the smart roadway stud 110, in accordance with one example embodiment of the disclosure. All or a portion of the method 500 may be performed by the one or more processors 204 of the particular smart road stud 110, the one or more processors 402 of the local stud control system 114 and/or the remote stud control system 118. Now referring to FIGS. 1-5, the example method 500 begins at the START block and proceeds to block 502, where the temperature sensor 222 receives temperature data from the ambient environment of the smart road stud 110. While the example method shows data being obtained by a single smart road stud 110, in operation, each of the smart road studs 110 can be obtaining temperature data from their temperature sensors and conducting the method described herein.

At block 504, the smart road stud 110 can wirelessly transmit the temperature data to the local stud control system 114. While the example embodiment of FIG. 5 describes the analysis of the temperature data taking place at the local stud control system 114, alternatively, the analysis of the temperature data and the determination whether to illuminate the LED panels 212, 214 and at what level and color can optionally be made at the one or more processors 204 of the smart road stud 110 or the remote stud control system 118. At block 506, the local stud control system 114 can wirelessly receive the temperature data. For example, the temperature data can be received by the one or more processors 402 via the radio/transceiver 406 and/or the network interface controller 408.

At block 508, a first temperature threshold parameter can be identified and the temperature data can be compared to the first temperature threshold parameter to determine if the temperature data is less than or less than or equal to the first temperature threshold parameter. For example, the one or more processors 402 can include or be communicably coupled to a hard drive or other data storage device. The data storage device can include threshold parameters and other data for use in calculations and comparisons being made by the one or more processors 402. In one example, the first temperature threshold parameter can be stored in the data storage device and included in the smart stud control box 401 with the one or more processors 402. While the example embodiment of FIG. 5 describes comparing only temperature data, in another example embodiment, humidity data may be sensed at the smart road stud 110 and the humidity data can also be compared to a first humidity threshold parameter. In that example, the system can evaluate if both the temperature threshold parameter and the humidity threshold parameter are violated (e.g., the humidity data is greater than or greater than or equal to the humidity threshold parameter) in order to determine if the LEDs on the LED panels 212, 214 should be illuminated to warn of the potential for ice on the roadway 102.

At block 510, an inquiry can be conducted to determine if the temperature data is less than or less than or equal to the first temperature threshold parameter. For example, if the first temperature data indicates the ambient temperature along the top surface 220 of the roadway 102 is 35 degrees Fahrenheit and the first temperature threshold parameter is 32 degrees Fahrenheit, then the determination would be that the temperature data does not violate (i.e., is not less than or less than or equal to) the first temperature threshold parameter. In another example, if the temperature data indicates the ambient temperature is 32 degrees Fahrenheit, then the temperature data would violate the first temperature threshold parameter if the comparison is a less than or equal to but would not violate the first temperature threshold parameter if the comparison is only less then. The determination of which comparison type to use can be up to the user.

If the temperature data is not less than or less than or equal to the first temperature threshold parameter, then the NO branch is followed to block 512. At block 512, the one or more processors 402 can generate and wirelessly transmit a signal to the smart road stud 110 to turn off the LEDs at the LED panels 212, 214 if the LED panels were indicating the potential for ice on the roadway 102 or to maintain the LEDs at the LED panels 212, 214 in the off configuration with regard to notification of the potential for ice on the roadway. While the example embodiment describes sending the signal to the smart road stud 110 from which the temperature data was received, in addition the signal can also be sent to all other smart road studs 110 associated with the particular local stud control system 114. The process can then return to block 502 to receive additional temperature data at the smart road stud 110.

Returning to the inquiry at block 510, if the temperature data is less than or less than or equal to the first temperature threshold, the YES branch can be followed to block 514. At block 514, an inquiry can be conducted to determine if there is another temperature threshold parameter to compare the temperature data to. In certain example embodiments, multiple temperature threshold parameters can be provided and used for comparison. Each parameter can be associated with a particular LED light output to show the increasing danger and/or likelihood of ice forming on the roadway 102. In one example, the one or more processors 402 can evaluate the data storage device to determine if there are additional temperature threshold parameters to compare the temperature data to. In addition, a similar analysis could be conducted for humidity threshold parameters if both are being evaluated together to determine the potential for ice on the roadway 102. If there is not an additional temperature threshold parameter to compare the temperature data to, then the NO branch can be followed to block 520. On the other hand, if there is at least one additional temperature threshold parameter to compare the temperature data to, the YES branch can be followed to block 516.

At block 516, the second temperature threshold parameter can be identified in, for example, the data storage device and the one or more processors 402 can compare the temperature data to the second temperature threshold parameter in substantially the same way as the comparison to the first data threshold parameter. At block 518, an inquiry is conducted to determine if the temperature data is less than or less than or equal to (i.e., violates) the second temperature threshold parameter. If the temperature data is less than or less than or equal to the second temperature threshold parameter, the YES branch can be followed to block 514 to determine if there is another temperature threshold parameter to compare the temperature data to. On the other hand, if the temperature data is not less than or less than or equal to the second temperature threshold parameter, the NO branch can be followed to block 520.

At block 520, the local stud control system 114 can identify the transmission color associated with the lowest temperature threshold parameter that the temperature data was less than or less than or equal to. In one example, each of the temperature threshold parameters can be associated with a shade of blue. For example, as the temperature threshold parameters get lower (e.g., further below the temperature that water freezes at) the darker the shade of blue the temperature threshold parameter is associated with. In another example embodiment, the temperature threshold parameters may be associated with any other color or each may be associated with a different color. In one example, the color or shade of color that each temperature threshold parameter is associated with may be designated in the data storage device as a set of parameters for driving the LEDs of the LED panels 212, 214. For example, the data storage device may include a table of temperature threshold parameters, but rather than the color "light blue" being placed next to one of the parameters, the table may include the operating parameters to transmit to the LEDs of the LED panels 212, 214 that will result in the LEDs emitting the color light blue. Similar operating parameters can be provided in the temperature threshold parameter table for each temperature threshold parameter. The one or more processors 402 can parse the temperature threshold parameter table based on the last temperature threshold parameter that the temperature data was less than or less than or equal to and can determine the associated LED operating parameters.

At block 522, the one or more processors 402 can identify all of the smart road studs 110 associated with the local stud control system 114. In one example, the data storage device can include a table of smart road studs 110 associated with the local stud control system 114 that can be parsed and reviewed by the one or more processors 402. At block 524, the local stud control system 114 can generate and wirelessly transmit an LED activation signal to each of the smart road studs 110 associated with the local stud control system 114. The LED activation signal can include instructions for each smart road stud 110 receiving the signal to turn on their LED panels 212, 214 and emit LED light in the transmission color identified in block 520. In one example, the one or more processors 402 can generate the activation signal and transmit it to the smart road studs via the radio/transceiver 406 and/or the network interface controller 408. In addition, the one or more processors 402 can wirelessly transmit the signal to adjacent local stud control systems 114, which can then signal the smart road studs 110 associated with those local stud control systems. In another example, the one or more processors 402 can wirelessly transmit the signal to the remote stud control system 118, which can determine which local stud control systems 114 to signal so that the smart road studs 110 associated with those local stud control systems 114 can communicate with their associated LED panels 212, 214 to emit LED light in the transmission color identified in block 520.

At block 526, each of the smart road studs 110 can receive the LED activation signal. For example, the LED activation signal can be received by the one or more processors 204. At block 528, the one or more processors 204 of the smart road stud 110 can generate and transmit a signal to the LED panels 212, 214 to activate or modify the activation of the LEDs to emit LED light in the transmission color identified in block 520. The process can then continue to block 502 to continue collecting temperature data and/or humidity data at the smart road studs 110.

Figure 6:
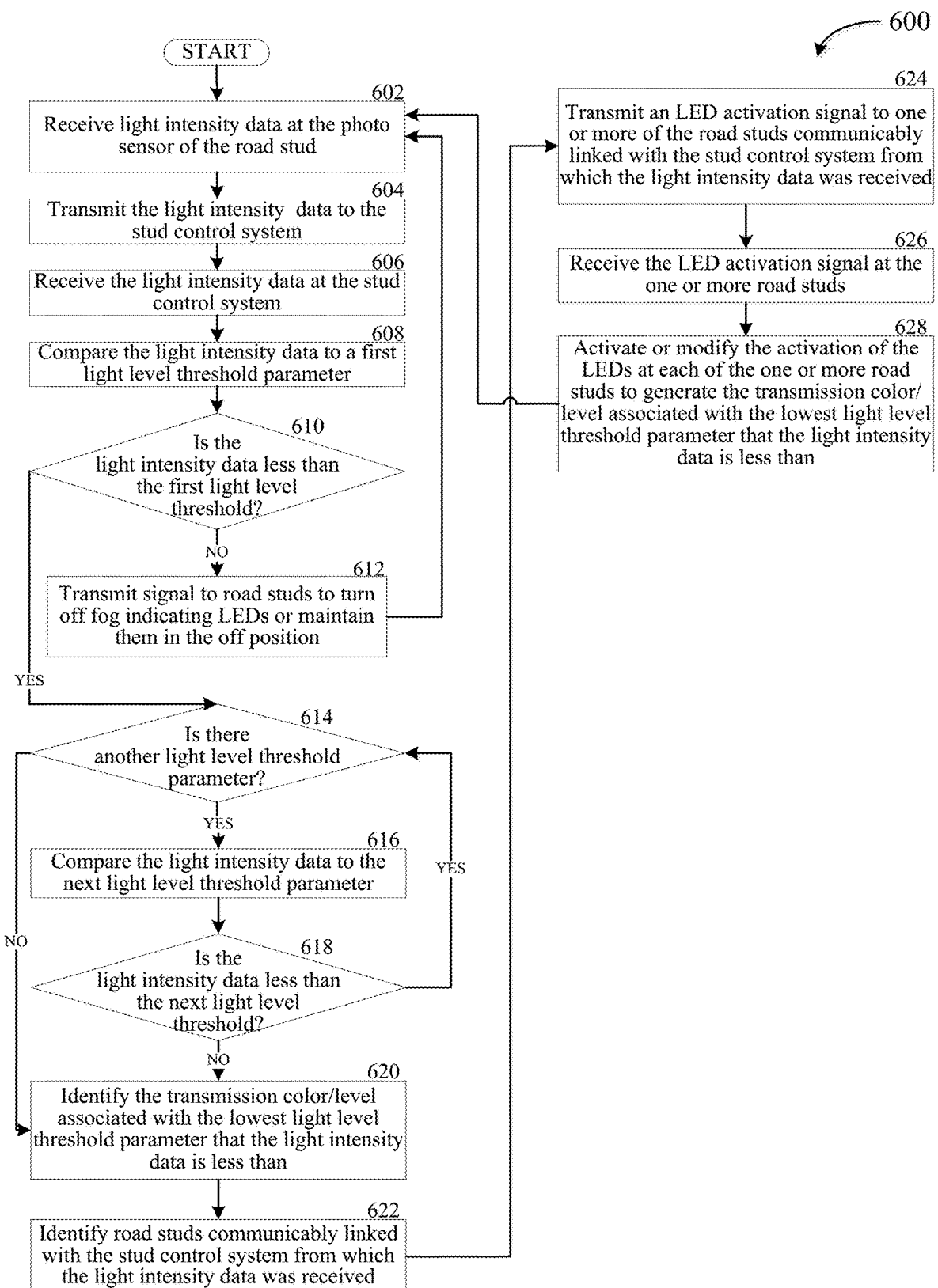
FIG. 6 is flow chart illustrating a method for determining the presence of fog, smoke or other visual inhibitors on a roadway and adjusting the brightness level and or color emitted by the smart roadway stud, according to one or more embodiments of the presently disclosed subject matter.

FIG. 6 is a flow chart illustrating an example method 600 for determining the presence of fog, smoke or other visual inhibitors on a roadway 102 and adjusting the brightness level and or color emitted by the smart roadway stud 110, in accordance with one example embodiment of the disclosure. All or a portion of the method 600 may be performed by the one or more processors 204 of the particular smart road stud 110, the one or more processors 402 of the local stud control system 114 and/or the remote stud control system 118.

Now referring to FIGS. 1-4 and 6, the example method 600 begins at the START block and proceeds to block 602, where the photosensor 224 receives light intensity data from the ambient environment of the smart road stud 110. While the example method shows light intensity data being obtained by a single smart road stud 110, in operation, each of the smart road studs 110 can be obtaining light intensity data from their photosensors 224 and conducting the method described herein.

At block 604, the smart road stud 110 can wirelessly transmit the light intensity data to the local stud control system 114. While the example embodiment of FIG. 6 describes the analysis of the light intensity data taking place at the local stud control system 114, alternatively, the analysis of the light intensity data and the determination whether to illuminate the LED panels 212, 214 and at what level and color can optionally be made at the one or more processors 204 of the smart road stud 110 or the remote stud control system 118. At block 606, the local stud control system 114 can wirelessly receive the light intensity data. For example, the light intensity data can be received by the one or more processors 402 via the radio/transceiver 406 and/or the network interface controller 408.

At block 608, a first light level threshold parameter can be identified and the light intensity data can be compared to the first light level threshold parameter to determine if the light intensity data is less than or less than or equal to the first light level threshold parameter. For example, the first light level threshold parameter can be stored in the data storage device and included in the smart stud control box 401 with the one or more processors 402.

At block 610, an inquiry can be conducted to determine if the light intensity data is less than or less than or equal to the first light level threshold parameter. For example, if the light intensity data indicates the ambient light output is 25 lumens along the top surface 220 of the roadway 102 and the first light level threshold parameter is 22 lumens, then the determination would be that the light intensity data does not violate (i.e., is not less than or less than or equal to) the first light level threshold parameter. In another example, if the light intensity data indicates the ambient light intensity is 22 lumens, then the light intensity data would violate the first light level threshold parameter if the comparison is a less than or equal to but would not violate the first light level threshold parameter if the comparison is only less than. The determination of which comparison type to use can be up to the user.

If the light intensity data is not less than or less than or equal to the first light level threshold parameter, then the NO branch is followed to block 612. At block 612, the one or more processors 402 can generate and wirelessly transmit a signal to the smart road stud 110 to turn off the LEDs at the LED panels 212, 214 if the LED panels were indicating the potential for fog, smoke, or other visual inhibitors on the roadway 102 or to maintain the LEDs at the LED panels 212, 214 in the off configuration with regard to notification of the potential for fog, smoke, or other visual inhibitors on the roadway 102. While the example embodiment describes sending the signal to the smart road stud 110 from which the light intensity data was received, in addition, the signal can also be sent to all other smart road studs 110 associated with the particular local stud control system 114. The process can then return to block 602 to receive additional light intensity data at the smart road stud 110.

Returning to the inquiry at block 610, if the light intensity data is less than or less than or equal to the first light level threshold, the YES branch can be followed to block 614. At block 614, an inquiry can be conducted to determine if there is another light level threshold parameter to compare the light intensity data to. In certain example embodiments, multiple light level threshold parameters can be provided and used for comparison. Each parameter can be associated with a particular LED light output to show the increasing danger and/or likelihood of fog, smoke or other visual inhibitors and to provide sufficient light output to be seen by the vehicle 108 during the fog, smoke, or other visual inhibitors. In one example, the one or more processors 402 can evaluate the data storage device to determine if there are additional light level threshold parameters to compare the light intensity data to. If there is not an additional light level threshold parameter to compare the light intensity data to, then the NO branch can be followed to block 620. On the other hand, if there is at least one additional light level threshold parameter to compare the light intensity data to, the YES branch can be followed to block 616.

At block 616, the second light level threshold parameter can be identified in, for example, the data storage device, and the one or more processors 402 can compare the light intensity data to the second light level threshold parameter in substantially the same way as the comparison to the first light level threshold parameter. At block 618, an inquiry is conducted to determine if the light intensity data is less than or less than or equal to (e.g., violates) the second light level threshold parameter. If the light intensity data is less than or less than or equal to the second light level threshold parameter, the YES branch can be followed to block 614 to determine if there is another light level threshold parameter to compare the light intensity data to. On the other hand, if the light intensity data is not less than or less than or equal to the second light level threshold parameter, the NO branch can be followed to block 620.

At block 620, the local stud control system 114 can identify the transmission color or light intensity level associated with the lowest light level threshold parameter that the light intensity data was less than or less than or equal to. In one example, each of the light level threshold parameters can be associated with a same color but emit LED light in that color at different intensities or lumen outputs. For example, the greater the fog or smoke (i.e., the lower the light intensity at the photo sensor 224) the greater the light intensity will be output at the LED panels 212, 214 so that there will be an increased chance the driver of a vehicle 108 or the vehicle 108 itself, can see the light being emitted by the smart road stud 110 through the fog, smoke, or other visual inhibitor. For example, as the light threshold parameters get lower the greater the lumen output of white light will be emitted. In another example embodiment, the light level threshold parameters may be associated with any other color or each may be associated with a different color. In one example, the color or shade of color that each light level threshold parameter is associated with and the output level of that color may be designated in the data storage device as a set of parameters for driving the LEDs of the LED panels 212, 214. For example, the data storage device may include a table of light level threshold parameters, but rather than "low white" being placed next to one of the parameters, the table may include the operating parameters to transmit to the LEDs of the LED panels 212, 214 that will result in the LEDs emitting the color white at a low lumen level. Similar operating parameters can be provided in the light level threshold parameter table for each light level threshold parameter. The one or more processors 402 can parse the light level threshold parameter table based on the last light level threshold parameter that the light intensity data was less than or less than or equal to and can determine the associated LED operating parameters.

At block 622, the one or more processors 402 can identify all of the smart road studs 110 associated with the local stud control system 114. In one example, the data storage device can include a table of smart road studs 110 associated with the local stud control system 114 that can be parsed and reviewed by the one or more processors 402. At block 624, the local stud control system 114 can generate and wirelessly transmit an LED activation signal to each of the smart road studs 110 associated with the local stud control system 114. The LED activation signal can include instructions for each smart road stud 110 receiving the signal to turn on their LED panels 212, 214 and emit LED light in the transmission color and intensity identified in block 620. In one example, the one or more processors 402 can generate the activation signal and transmit it to the smart road studs 110 via the radio/transceiver 406 and/or the network interface controller 408. In addition, the one or more processors 402 can wirelessly transmit the signal to adjacent local stud control systems 114, which can then signal the smart road studs 110 associated with those local stud control systems. In another example, the one or more processors 402 can wirelessly transmit the signal to the remote stud control system 118, which can determine which local stud control systems 114 to signal so that the smart road studs 110 associated with those local stud control systems 114 can communicate with their associated LED panels 212, 214 to emit LED light in the transmission color and intensity identified in block 620.

At block 626, each of the smart road studs 110 can receive the LED activation signal. For example, the LED activation signal can be received by the one or more processors 204. At block 628, the one or more processors 214 of the smart road stud 110 can generate and transmit a signal to the LED panels 212, 214 to activate or modify the activation of the LEDs to emit LED light in the transmission color and intensity identified in block 620. The process can then continue to block 602 to continue collecting light intensity data at the smart road studs 110.

Figure 7:
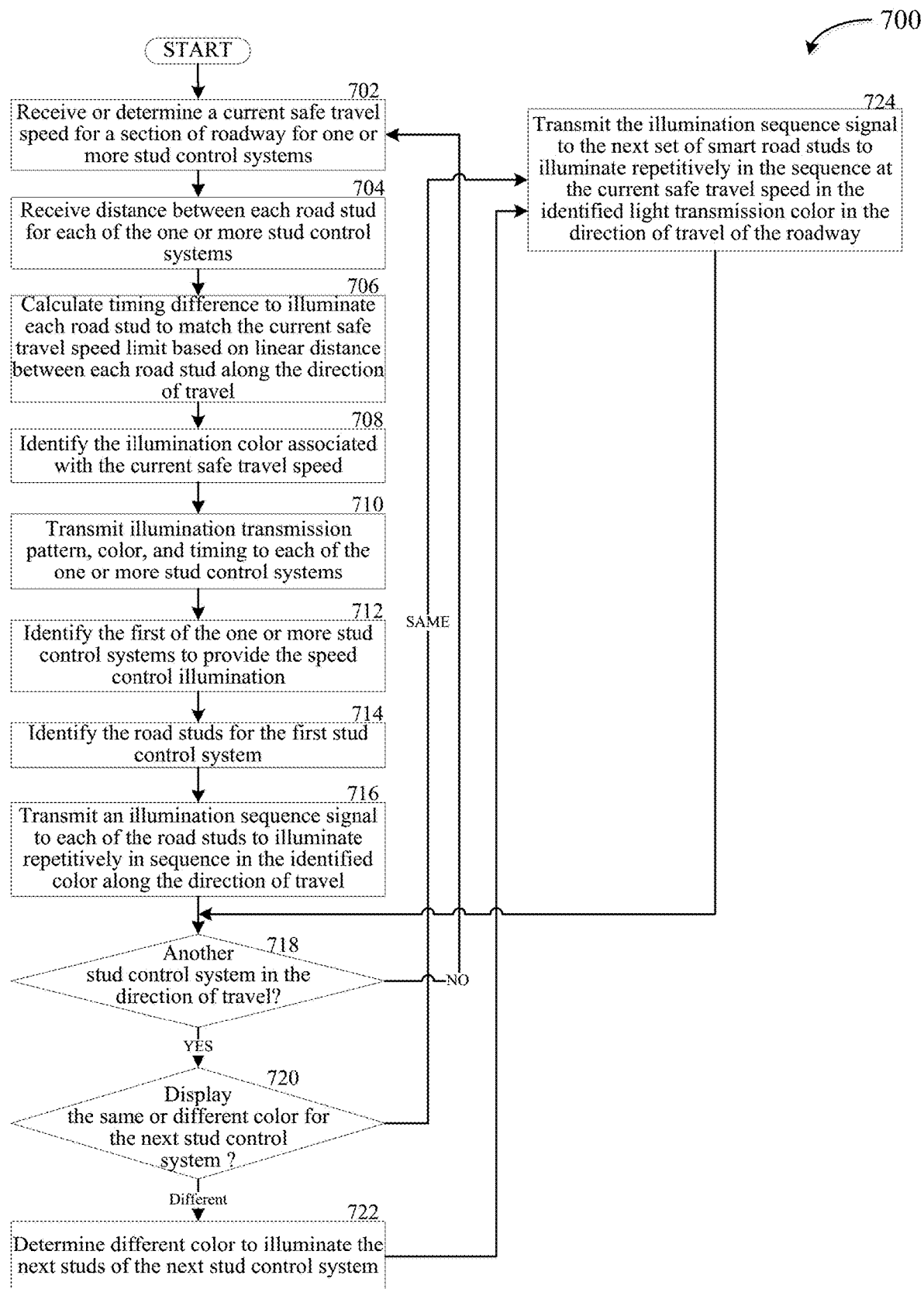
FIG. 7 is a flow chart illustrating a method for determining a current and/or safe vehicle speed for a roadway or section of roadway and generating a repeating signal at the one or more smart roadway studs for that roadway or section of roadway at the current and/or safe vehicle speed, according to one or more embodiments of the presently disclosed subject matter.

FIG. 7 is a flow chart illustrating an example method 700 for determining a current and/or safe vehicle speed for a roadway 102 or section of roadway 102 and generating a repeating signal at the one or more smart roadway studs 110 for that roadway 102 or section of roadway 102 at the current and/or safe vehicle speed, in accordance with one example embodiment of the disclosure. All or a portion of the method 700 may be performed by the one or more processors 204 of the particular smart road stud 110, the one or more processors 402 of the local stud control system 114 and/or the remote stud control system 118. Now referring to FIGS. 1-4 and 7, the example method 700 begins at the START block and proceeds to block 702, where the remote stud control system 118 can receive or determine the current safe travel speed to signal for a section of the roadway 102 for one or more local stud control systems 114. For example, the current safe travel speed can be the posted speed limit or a speed that is less than the posted speed limit. In one example, the current safe travel speed can be more than one vehicle speed. In this example, the current safe travel speed can be reduced or increased over one or more distances based on traffic, environmental factors, accidents, construction, or other issues on the roadway 102. The current safe travel speed can be received or determined by the one or more processors of the remote stud control system 118. For example, the current safe travel speed can be transmitted to the remote stud control system 118 by a separate traffic management system. Alternatively, the current safe travel speed can be determined by the remote stud control system 118 from a data storage device at or communicably coupled to the remote stud control system 118 that includes the posted speed limit for the particular section of roadway 102. In another example, the local stud control system 114 can collect current vehicle speed data on the particular section of roadway 102 and can wirelessly transmit that current vehicle speed data to the remote stud control system 118. For example, the local stud control system 114 can determine current vehicle speed via one or more of the vehicle sensor 218 (e.g., a multi-axis magnetic sensor in each of the smart road studs 110) or the Doppler radar detector 302. In another example, the local stud control system 114 can determine the event vector data based on data received from the vehicle sensor 218 (e.g., a multi-axis magnetic sensor) in one or more smart road studs 110 and can pass the event vector data to the remote stud control system 118. Based on the event vector data, the known distance between the smart road studs 110 providing the event vector data, the vehicle speed can be calculated to determine what might be a current safe travel speed for the particular section of roadway 102.

At block 704, the travel path distance between each smart road stud 110 or group of smart road studs 110 for each of the local stud control systems 114 for which a current safe travel speed is to be signaled by the smart road studs 110 can be received by the remote stud control system 118. For example, the one or more processors of the remote stud control system 118 can access the data storage device associated with the remote stud control system 118 to identify data representing travel path distance information between each smart road stud 110 associated with the local stud control systems 114. At block 706, the remote stud control system 118 can calculate the timing difference to illuminate each smart road stud 110 for each of the local stud control systems 114 to match the identified or determined current safe travel speed limit based on the travel path distance (i.e., the linear distance along the direction of travel of the roadway 102).

At block 708, the remote stud control system 118 can identify the illumination color associated with the current safe travel speed. In one example, different colors can be associated with different speeds or with different levels of speed as compared to the posted speed limit for the roadway 102. For example, if the posted speed limit is 60 miles per hour and the current safe travel speed is also 60 miles per hour, then the illumination color can be a first color. If, in this example, the current safe travel speed is between 20-59 miles per hour, for example, the illumination color can be a second color different from the first color. If in this example, the current safe travel speed is between 0-19 miles per hour, the illumination color can be a third color different from the first and second colors. In certain example embodiments, the first color can be green, the second color can be yellow and the third color can be red. However, this is for example purposes only as the actual illumination colors and the speed ranges for each illumination color can be adjustable and configurable based on the particular roadway 102. In another example, the illumination color can be based on the percentage of the posted speed limit that the current safe travel speed is determined to be. In one example, the data storage device for the remote stud control system 118 can include a current safe travel speed table that includes current safe travel speeds (or percentages of the posted speed limit for a roadway) and the illumination color associated with that current safe travel speed. The one or more processors of the remote stud control system 118 can parse this table and identify the illumination color for the current safe travel speed.

At block 710, the remote stud control system 118 can wirelessly transmit an illumination sequence signal that can include the illumination transmission pattern, illumination color, and illumination timing for the smart road studs 110 to each of the one or more local stud control systems 114. The illumination sequence signal can provide all of the information necessary for teach of the smart road studs 110 to illuminate at that particular color and current safe travel speed along the direction of travel of the roadway 102. In one example, the illumination sequence signal can include smart road stud identifiers to designate which smart road studs 110 are to illuminate at a particular time and sequence.

At block 712, the first local stud control system 114 of the one or more local stud control systems 114 that will be signaling the current safe travel speed is identified. In one example, this can be completed by the remote stud control system 118 and/or the particular local stud control system 114 based on the illumination transmission pattern, which can list all of the local stud control systems 114 that will be illuminating at this particular current safe travel speed. At block 714, the smart road studs 110 for the first local stud control system 114 are identified. In one example, the smart road studs 110 are identified by the one or more processors 402 of the first local stud control system 114.

At block 716, an illumination sequence signal is wirelessly transmitted to each of the smart roads studs 110, or to a particular subsection of the smart road studs 110, associated with the first local stud control system 114. In one example, the one or more processors 402 of the first local stud control system 114 can wirelessly transmit the illumination sequence signal to the one or more processors 204 of each of the smart road studs 110 via the radio/transceiver 406 and/or the network interface controller 408. The illumination sequence signal can include the timing to illuminate the LED panels 212, 214, the length of illumination, and the illumination color for each smart road stud 110.

The illumination sequence signal can be received by each of the smart road studs 110, which can illuminate their respective LED panels 212, 214 in the desired illumination color based on the sequence timing and color in the illumination sequence signal. The result can be an illumination pattern such that a wave of pulsing LED light is emitted by the smart road studs along the path of travel of the roadway. For vehicles 108 that are moving at the current safe travel speed, the illumination of the smart road studs 110 will appear to be static (i.e., not pulsing on and off). For vehicles 108 that are travelling at a speed greater than the current safe travel speed, the illumination of the smart road studs 110 will appear as waves of light moving towards the particular vehicle 108, which can provide a visual cue to decelerate the vehicle 108 to the current safe travel speed. For vehicles 108 that are traveling below the current safe travel speed, the illumination of the smart road studs 110 will appear as waves of light moving away from the particular vehicle 108, which can provide a visual cue to accelerate the vehicle 108 to the current safe travel speed.

At block 718, an inquiry is conducted to determine if there is another local stud control system 114 in the direction of travel of the roadway 102 for which current safe travel speed signaling is being provided. In one example, the determination can be made by the one or more processors of the remote stud control system 118. If there is not another local stud control system 114 in the direction of travel of the roadway for which current safe travel speed signaling is being provided, the NO branch returns to block 702. Otherwise, the YES branch is followed to block 720.

At block 720, an inquiry is conducted to determine if the next local stud control system 114 or portion of the first local stud control system or next local stud control system in the path of travel of the roadway 102 will display the same or different color of LED light via the LED panels 212, 214 and/or at a sequence for the same or different current safe travel speed. In one example, this determination can be made by the one or more processors of the remote stud control system 118 and can be included in the illumination sequence signal. For example, in situations where, due to a traffic jam, accident, construction or the like, there may be a progressive slowing of traffic prior to the actual incident on the roadway 102. This can be shown by progressively slowing the current safe travel speed as indicated by the timing sequence of illumination of the smart road studs 110 along the path of travel of the roadway 102. This can also be signaled by one or more changes in the color of illumination along with the slowing of the timing sequence of illumination. If the next local stud control system or a portion of the first local stud control system or the next local stud control system will generate a light sequence at a different current safe travel speed and/or in a different illumination color, the DIFFERENT branch can be followed to block 722.

At block 722, the one or more processors of the remote stud control system 118 can determine a different color and/or illumination sequence timing for the different current safe speed. As discussed above, the data storage device for the remote stud control system 118 can include a current safe travel speed table that includes current safe travel speeds (or percentages of the posted speed limit for a roadway) and the illumination color associated with that current safe travel speed. The one or more processors of the remote stud control system 118 can parse this table and identify the illumination color for the current safe travel speed. The illumination sequence timing for the smart road studs 110 can be determined by the one or more processors of the remote stud control system 118 based on the new current safe travel speed and the travel path distance between the smart road studs for the next local stud control system or a portion of the first local stud control system or the next local stud control system. This information can be included in the illumination sequence signal sent by the remote stud control system 118 to each of the one or more local stud control systems 114 that will be providing current safe travel speed signaling. The process can then continue to block 724.

Returning to the inquiry of block 720, if the next local stud control system or a portion of the first local stud control system or the next local stud control system will generate the same light sequence at the same current safe travel speed as the first or most adjacent local stud control system 114 or portion thereof, and in the same illumination color, the SAME branch can be followed to block 724. At block 724, the first local stud control system 114 or the next local stud control system 114 can transmit the illumination sequence signal to the next set of smart road studs 110 to illuminate repetitively in the sequence at the current safe travel speed in the identified light transmission color in the direction of travel of the roadway 102. As discussed, the current safe travel speed can be the same or different from the prior current safe travel speed for the prior section of smart road studs 110 and the illumination color can also be the same or different from that transmitted by the prior section of smart road studs 110. The smart road studs 110 associated with the next local stud control system or in the portion of the first or next local stud control system can each receive the illumination sequence signal via the respective one or more processors 204 and can generate light output at the LED panels 212, 214 in the color and in the pattern and timing provided by the illumination sequence signal to move the illuminated light output from the smart road studs 110 in the direction of travel along the roadway 110 at the current safe travel speed for that section of roadway 102. The process can then return to block 718 to determine if there is another local stud control system along the direction of travel of the roadway 102 to provide current safe travel speed signaling.

Figure 8:
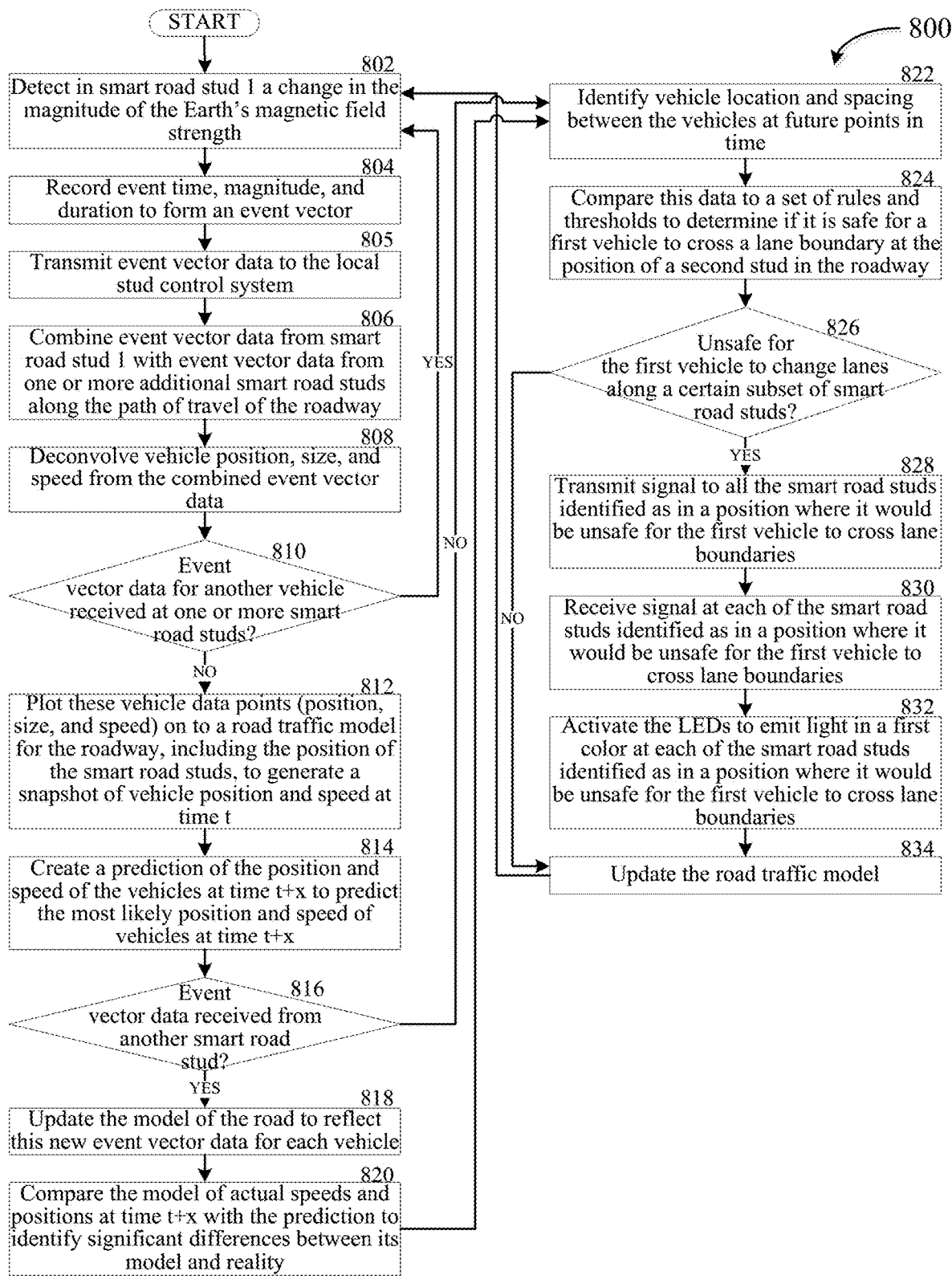
FIG. 8 is a flow chart illustrating a method for generating a road traffic model of vehicles on a roadway based on information received from multiple smart road studs and determining if a vehicle in the traffic model can safely change from one lane to another lane on the roadway, according to one or more embodiments of the presently disclosed subject matter.

FIG. 8 is a flow chart illustrating an example method 800 for generating a road traffic model of vehicles 108 on a roadway 102 based on information received from multiple smart road studs 110 and determining if a vehicle 108 in the traffic model can safely change from one lane 104 to another lane 106 on the roadway 102, in accordance with one example embodiment of the disclosure. All or a portion of the method 800 may be performed by the one or more processors 204 of the particular smart road stud 110, the one or more processors 402 of the local stud control system 114 and/or the remote stud control system 118. Now referring to FIGS. 1-4 and 8, the example method 800 begins at the start block and proceeds to block 802, where the vehicle sensors 218 in the first smart road stud 110 detect a change in magnitude of the Earth's magnetic field strength. In one example, the vehicle sensor 218 is a multi-axis magnetic sensor and the change is magnitude can be 3 microTeslas (µT) in a 30 µT field. The example vehicle sensor 218 can be a multi-axis magnetic sensor. At block 804, the one or more processors 204 of the first smart road stud 110 receive the change in magnitude and record event time, magnitude, and duration to form an event vector data. In one example, the event vector data can also include a smart road stud identifier to identify which smart road stud 110 the event vector data originated from.

At block 805, the event vector data can be wirelessly transmitted from the first smart road stud 110 to the local stud control system 114 associated with the particular smart road stud 110. For example, the one or more processors 204 of the first smart road stud 110 can activate a DASH7 link from standby mode send the event vector data to the local stud control system 114 via DASH7 wireless communication. At block 806, the local stud control system 114 can receive the event vector data from the first smart road stud 110 and can combine the event vector data from the first smart road stud 110 with event vector data from one or more additional smart road studs along the path of travel of the roadway 102. In one example, the position of each of the smart road studs 110 is known to the local stud control system 114 and the local stud control system 114 and each of the smart road studs associated with the local stud control system 114 share a sense of time.

At block 808, the one or more processors 402 of the local stud control system 114 uses the combined event vectors to deconvolve the vehicle position, size, and speed for each vehicle 108 on the roadway 102. For example, the vehicle size can be determined based on the magnitude of the change in the magnetic field strength and the speed of the vehicle can be determined based on the duration of the change of the magnetic field at the smart road stud 110. At block 810, an inquiry is conducted to determine if event vector data for another vehicle is received at the one or more smart road studs 110. If event vector data is received for another vehicle, the YES branch is followed back to block 802 to detect additional changes in magnetic fields at the smart road studs 110 associated with the local stud control system 114. If event vector data for another vehicle is not received, then the NO branch is followed to block 812.

At block 812, the one or more processors 402 of the local stud control system 114 or the remote stud control system 118 can plot these vehicle data points (position, size and speed) on to a road traffic model for the roadway 102, which can include the position of each of the smart road studs 110, to generate a snapshot of the position of all of the vehicles 108 on the roadway at time (t). At block 814, the one or more processors 402 of the local stud control system 114 or the remote stud control system 118 can create a prediction model of the position and speed of each of the vehicles 108 on the roadway 102 at a time (t+x) to predict the most likely position and speed of each of the vehicles 108 at time (t+x). In one example, the time interval (x) is anywhere in the range of 0.1 seconds to 20 seconds. In certain example embodiments, the prediction model is based on previous traffic data and predicts how each of the vehicles will behave based on how traffic has behaved in the past under similar conditions. In other example embodiments, the prediction model does not require any prior traffic data but instead uses correlation and probabilistic likelihood to predict vehicle positions and speeds. For example, Kalman filters could be used in this predictive modeling technique.

At block 816, an inquiry is conducted to determine if additional event vector data is received from another smart road stud 110. If additional event vector data is not received, the NO branch can be followed to block 822. On the other hand, if additional event vector data is received from smart road studs 110 on the roadway 102, the YES branch can be followed to block 818. At block 818, the one or more processors 402 of the local stud control system 114 or the remote stud control system 118 can analyze the additional event vector data received and generate an updated road traffic model to reflect the additional event vector data.

At block 820, the one or more processors 402 of the local stud control system 114 or the remote stud control system 118 can compare the updated model of actual speeds and positions of the vehicles 108 on the roadway 102 to the predictive traffic model generated at block 814 to identify differences between the predictive model and the updated actual model of the speed and position of each vehicle 108 on the roadway 102. Based on the identified differences, the future predictive models can be modified in an effort to reduce the likelihood of error. The updated actual model is at time (t+x) to correspond with the time of the predictive model.

At block 822, the one or more processors 402 of the local stud control system 114 or the remote stud control system 118 can identify vehicle location and spacing between the vehicles at future points in time based on the continuously updating predictive traffic model for the roadway 102. At block 824, the one or more processors 402 of the local stud control system 114 or the remote stud control system 118 can compare the data corresponding to the position and speed of each of the vehicles 108 on the roadway 102 to a set of business rules and spacing/timing thresholds stored, for example, in the data storage device associated with the local stud control system 114 or the remote stud control system 118 to determine if it is safe (e.g., the thresholds and/or rules are not violated) for a first vehicle 108 to cross a lane boundary at the position of a second smart road stud (e.g., smart road stud 110e) in the roadway 102. The business rules and/or thresholds used in the comparison of block 824 can include, but are not limited to the likelihood of a vehicle 108 being present at the same position in an adjacent lane 104, the likelihood of a vehicle being within 2-3 smart road studs 110 of another vehicle 108 in an adjacent lane 104, the likelihood of another vehicle 108 changing lanes, and/or the likelihood of a vehicle 108 accelerating to overtake the first vehicle 108. By using a combination of these rules, the model could predict which smart road studs correspond to points of the roadway where it would be unsafe for the first vehicle 108 to cross the lane boundaries.

At block 826, an inquiry is conducted to determine if it is unsafe for the first vehicle 108 to change lanes along or adjacent to a certain subset of smart road studs 110. In one example, the determination can be made by the one or more processors 402 of the local stud control system 114 or the remote stud control system 118 and based on the comparison of block 824. If there is no unsafe area to change lanes, the NO branch can be followed to block 834. If there are one or more areas where it is unsafe for the first vehicle to change lanes, the YES branch can be followed to block 828. At block 828, the one or more processors 402 of the local stud control system 114 or the remote stud control system 118 can generate an activation signal and can transmit the activation signal to each of the smart road studs 110 identified as in a position where it would be unsafe for the first vehicle to cross lane boundaries. For example, the one or more processors 402 of the local stud control system 114 can activate a DASH7 link from standby mode send the activation signal to each of the smart road studs 110 via DASH7 wireless communication. In one example, the activation signal can include an illumination color to illuminate the LEDs of the LED panels 212, 214 and a period of activation identifying how long to activate the LEDs for that particular smart road stud 110.

At block 830, the activation signal can be received at each of the smart road studs 110 identified as in a position where it would be unsafe for the first vehicle 108 to cross lane boundaries. In one example, the activation signal can be received by the one or more processors 204 of each respective smart road stud 110. The one or more processors 204 can then activate the LEDs of the LED panels 212, 214 to emit light in a first color for the identified time at each of the smart road studs 110 identified as in a position where it would be unsafe for the first vehicle 108 to cross lane boundaries at block 832. In one example, the first color can be red, but any other color may alternatively be used. At block 834, the one or more processors 402 of the local stud control system 114 or the remote stud control system 118 can update the traffic model for the roadway 102. The process can then return to block 802 to received additional event vector data from each of the smart road studs 110 on the roadway 102.

Figure 9:
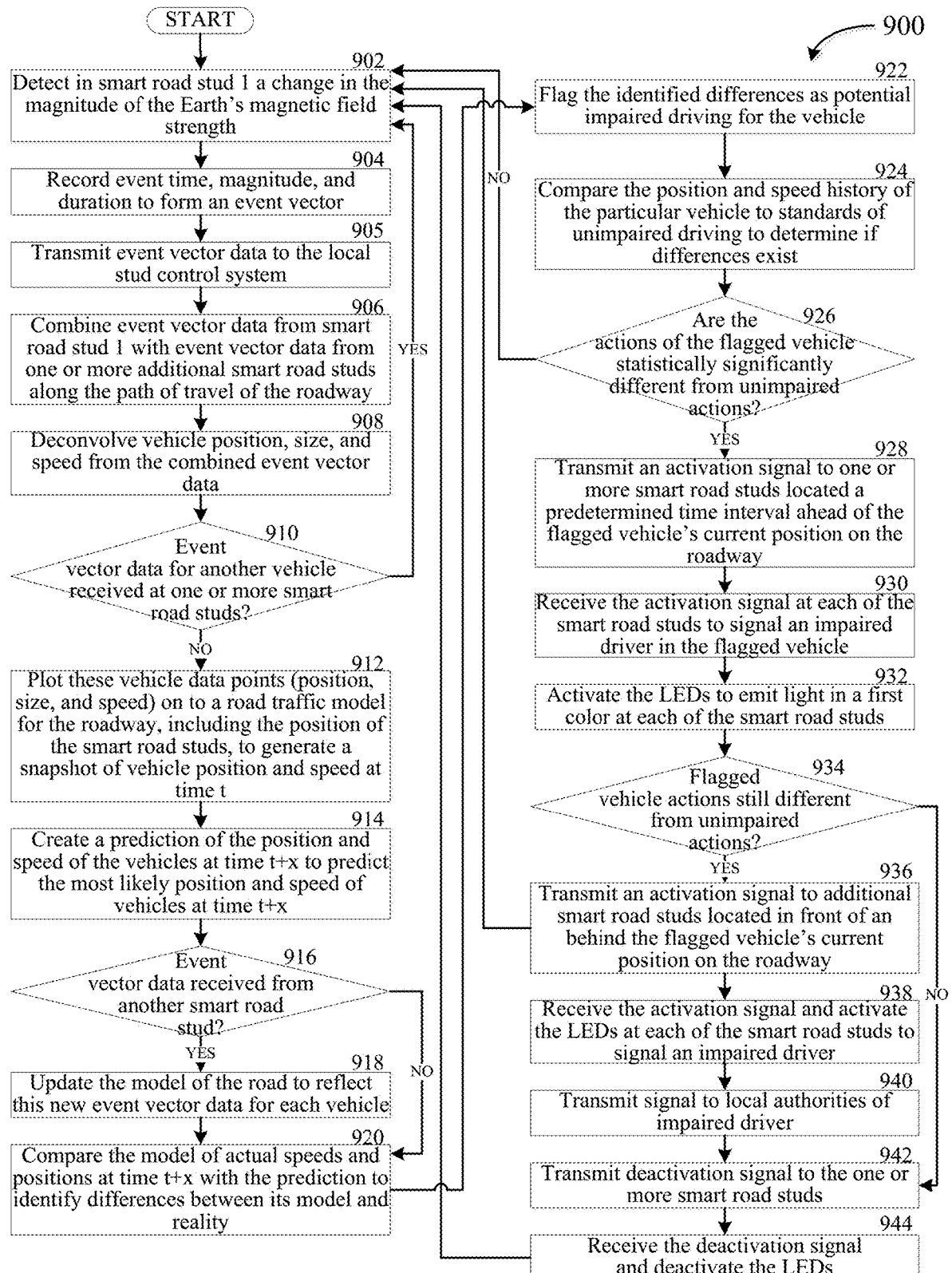
FIG. 9 is a flow chart illustrating a method for generating a road traffic model of vehicles on a roadway based on information received from multiple smart road studs and determining if a driver of a vehicle is impaired and/or driving erratically based on the road traffic model, according to one or more embodiments of the presently disclosed subject matter.

FIG. 9 is a flow chart illustrating an example method 900 for generating a road traffic model of vehicles 108 on a roadway 102 based on information received from multiple smart road studs 110 and determining if a driver of a vehicle 108 is impaired and/or driving erratically based on the road traffic model, in accordance with one example embodiment of the disclosure. All or a portion of the method 900 may be performed by the one or more processors 204 of the particular smart road stud 110, the one or more processors 402 of the local stud control system 114 and/or the remote stud control system 118. Now referring to FIGS. 1-4 and 9, the example method 900 begins at the start block and proceeds to block 902, where the vehicle sensors 218 in the first smart road stud 110 detect a change in magnitude of the Earth's magnetic field strength. In one example, the vehicle sensor 218 is a multi-axis magnetic sensor and the change is magnitude can be 3 µT in a 30 µT field. The example vehicle sensor 218 can be a multi-axis magnetic sensor. At block 904, the one or more processors 204 of the first smart road stud 110 receive the change in magnitude and record event time, magnitude, and duration to form an event vector data. In one example, the event vector data can also include a smart road stud identifier to identify which smart road stud 110 the event vector data originated from.

At block 905, the event vector data can be wirelessly transmitted from the first smart road stud 110 to the local stud control system 114 associated with the particular smart road stud 110. For example, the one or more processors 204 of the first smart road stud 110 can activate a DASH7 link from standby mode send the event vector data to the local stud control system 114 via DASH7 wireless communication. At block 906, the local stud control system 114 can receive the event vector data from the first smart road stud 110 and can combine the event vector data from the first smart road stud 110 with event vector data from one or more additional smart road studs along the path of travel of the roadway 102. In one example, the position of each of the smart road studs 110 is known to the local stud control system 114 and the local stud control system 114 and each of the smart road studs associated with the local stud control system 114 share a sense of time.

At block 908, the one or more processors 402 of the local stud control system 114 uses the combined event vectors to deconvolve the vehicle position, size, and speed for each vehicle 108 on the roadway 102. For example, the vehicle size can be determined based on the magnitude of the change in the magnetic field strength and the speed of the vehicle can be determined based on the duration of the change of the magnetic field at the smart road stud 110. At block 910, an inquiry is conducted to determine if event vector data for another vehicle is received at the one or more smart road studs 110. If event vector data is received for another vehicle 108, the YES branch is followed back to block 902 to detect additional changes in magnetic fields at the smart road studs 110 associated with the local stud control system 114. If event vector data for another vehicle 108 is not received, then the NO branch is followed to block 912.

At block 912, the one or more processors 402 of the local stud control system 114 or the remote stud control system 118 can plot these vehicle data points (position, size and speed) on to a road traffic model for the roadway 102, which can include the position of each of the smart road studs 110, to generate a snapshot of the position of all of the vehicles 108 on the roadway 102 at time (t). At block 914, the one or more processors 402 of the local stud control system 114 or the remote stud control system 118 can create a prediction model of the position and speed of each of the vehicles 108 on the roadway 102 at a time (t+x) to predict the most likely position and speed of each of the vehicles 108 at time (t+x). In one example, the time interval (x) is anywhere in the range of 0.1 seconds to 20 seconds. In certain example embodiments, the prediction model is based on previous traffic data and predicts how each of the vehicles will behave based on how traffic has behaved in the past under similar conditions. In other example embodiments, the prediction model does not require any prior traffic data but instead uses correlation and probabilistic likelihood to predict vehicle positions and speeds. For example, Kalman filters could be used in this predictive modeling technique.

At block 916, an inquiry is conducted to determine if additional event vector data is received from another smart road stud 110. If additional event vector data is not received, the NO branch can be followed to block 920. On the other hand, if additional event vector data is received from smart road studs 110 on the roadway 102, the YES branch can be followed to block 918. At block 918, the one or more processors 402 of the local stud control system 114 or the remote stud control system 118 can analyze the additional event vector data received and generate an updated road traffic model to reflect the additional event vector data.

At block 920, the one or more processors 402 of the local stud control system 114 or the remote stud control system 118 can compare the updated model of actual speeds and positions of the vehicles 108 on the roadway 102 to the predictive traffic model generated at block 914 to identify differences between the predictive model and the updated actual model of the speed and position of each vehicle 108 on the roadway 102. At block 922, the one or more processors 402 of the local stud control system 114 or the remote stud control system 118 can identify the one or more vehicles 108 associated with the identified differences between the predictive traffic model and actual vehicle speed and positioning and can flag each of those one or more vehicles 108 as having a potential impaired driver driving the vehicle 108. For the remainder of FIG. 9, the example will be described with reference to a first vehicle 108 having a potential impaired driver. However, more than one vehicle can be monitored at a time by the local stud control system 114 and/or the remote stud control system 118.

At block 924, the one or more processors 402 of the local stud control system 114 or the remote stud control system 118 can evaluate recent historical data for the first flagged vehicle 108 (e.g., the immediately prior 1-30 minutes or driving history) to identify the position and speed history for the first flagged vehicle 108 and can compare the position and speed history of the first flagged vehicle 108 to standards of unimpaired driver actions of a vehicle to determine if a difference exists. In one example, the historical data and/or the standards of unimpaired driver actions in a vehicle can be stored in the data storage device and can be accessed by the one or more processors 402 of the local stud control system 114 or the remote stud control system 118. At block 926, an inquiry can be conducted to determine if the actions of the first flagged vehicle 108 are statistically significantly different from the standards of unimpaired driver actions. In one example, the determination can be made by the one or more processors 402 of the local stud control system 114 or the remote stud control system 118. If the actions of the first flagged vehicle 108 are not statistically significantly different, the NO branch can be followed back to block 902 to obtain additional event vector data from the smart road studs 110. If the actions of the first flagged vehicle 108 are statistically significantly different, the YES branch can be followed to block 928.

At block 928, the one or more processors 402 of the local stud control system 114 or the remote stud control system 118 can generate and wirelessly transmit an activation signal to one or more smart road studs 110 located a predetermined time interval ahead of the first flagged vehicle's current position on the roadway 102. In one example, the transmission of the activation signal can continue and can be continually updated to be sent to the one or more smart road studs 110 that are the predetermined time interval ahead of the vehicle 108 as the vehicle moves along the roadway 102. The activation signal can be sent from the local stud control system 114 via the radio/transceiver 406 and/or the network interface controller 408. For example, the one or more processors 402 of the local stud control system 114 can activate a DASH7 link from standby mode send the activation signal to each of the smart road studs 110 via DASH7 wireless communication. In one example, the activation signal includes illumination color data identifying a first color to illuminate the LEDs of the LED panels 212, 214, and an activation period identifying how long to activate the LEDs on the LED panels 212, 214.

At block 930, the one or more smart road studs 110 can receive the activation signal to signal an impaired driver in the first flagged vehicle. In one example, the activation signal can be received by the one or more processors 402 of each respective smart road stud 110. At block 932, the one or more processors 204 of each smart road stud 110 can activate the LEDs at the LED panels 212, 214 based on the activation signal to emit light in the first color. In one example, the first color is yellow or amber and the activation signal instructs the smart road studs to blink the LEDs on and off in a repeating pattern for a predetermined period of time. The blinking of the lights in front of the path of the first flagged vehicle 108 can be an indication to the driver of the first flagged vehicle that they are driving erratically and should make corrections immediately or leave the roadway 102.

At block 934, an inquiry is conducted to determine if the first flagged vehicle's actions are still statistically significantly different from unimpaired actions. In one example, the determination can be made by the one or more processors 402 of the local stud control system 114 or the remote stud control system 118 and can be based on an updated predictive model and updated real time information for the speed and position of the first flagged vehicle 108 as well as updated historical information for the speed and positioning of the first flagged vehicle based on event vector data obtained by the smart road studs 110. In certain example embodiments, the updated review can be conducted a predetermined amount of time after the initial activation signal. For example, the predetermined amount of time can be anywhere between 1 second-10 minutes after the initial activation signal was transmitted in block 928 and more preferably substantially 5 minutes after the initial activation signal. If the first flagged vehicle's actions are still statistically significantly different from the actions of an unimpaired driver, then the YES branch can be followed to block 936.

At block 936, the one or more processors 402 of the local stud control system 114 or the remote stud control system 118 can generate and wirelessly transmit a second activation signal to one or more smart road studs 110 located both a predetermined time interval ahead of the first flagged vehicle's current position and immediately behind the first flagged vehicle's position on the roadway 102. In one example, the transmission of the second activation signal can continue and can be continually updated to be sent to the one or more smart road studs 110 that are the predetermined time interval ahead of the vehicle 108 and immediately behind the vehicle for a predetermined distance as the vehicle moves along the roadway 102. The second activation signal can be sent from the local stud control system 114 via the radio/transceiver 406 and/or the network interface controller 408. For example, the one or more processors 402 of the local stud control system 114 can activate a DASH7 link from standby mode send the second activation signal to each of the smart road studs 110 via DASH7 wireless communication. In one example, the second activation signal includes illumination color data identifying a first color to illuminate the LEDs of the LED panels 212, 214, and an activation period identifying how long to activate the LEDs on the LED panels 212, 214.

At block 938, the one or more smart road studs 110 can receive the second activation signal to signal a continued impaired driver in the first flagged vehicle 108. In one example, the second activation signal can be received by the one or more processors 402 of each respective smart road stud 110. The one or more processors 204 of each smart road stud 110 can activate the LEDs at the LED panels 212, 214 based on the second activation signal to emit light in the first color. In one example, the first color is yellow or amber and the second activation signal instructs the smart road studs 110 to blink the LEDs on and off in a repeating pattern for a predetermined period of time. The blinking of the lights both in front of the path of the first flagged vehicle 108 and behind the path of the first flagged vehicle can be an indication to drivers of other vehicles to use caution when approaching or being approached by the first flagged vehicle 108 that they are driving erratically on the roadway 102. At block 940, the one or more processors 402 of the local stud control system 114 or the remote stud control system 118 can transmit a signal or message to local authorities (e.g., police) notifying them of the erratic driving by the first flagged vehicle 108. In one example, the signal or message can include a current location of the first flagged vehicle and optionally a video recording of the first flagged vehicle, which can be recorded by the video camera 304. The process can then return to block 902 to receive additional event vector data for vehicles 108 on the roadway 102.

Returning to the inquiry of block 934, if the first flagged vehicle's actions are no longer statistically significantly different than those of an unimpaired driver, then the NO branch can be followed to block 942. At block 942, the one or more processors 402 of the local stud control system 114 or the remote stud control system 118 can generate and wirelessly transmit a deactivation signal to one or more smart road studs 110 located a predetermined time interval ahead of the first flagged vehicle's current position on the roadway 102 or may simply stop sending the activation signal which will time-out as the first flagged vehicle continues down the roadway 102. The deactivation signal can be sent from the local stud control system 114 via the radio/transceiver 406 and/or the network interface controller 408. For example, the one or more processors 402 of the local stud control system 114 can activate a DASH7 link from standby mode send the deactivation signal to each of the smart road studs 110 via DASH7 wireless communication. In one example, the deactivation instructs each smart road stud 110 to turn off the LEDs of the LED panels 212, 214 signifying a potentially impaired driver.

At block 944, the one or more smart road studs 110 can receive the deactivation signal. In one example, the deactivation signal can be received by the one or more processors 402 of each respective smart road stud 110. The one or more processors 204 of each smart road stud 110 can deactivate the LEDs at the LED panels 212, 214 based on the deactivation signal. The process can then continue to block 902 to receive additional event vector data for vehicles 108 on the roadway 102.

Figure 10:
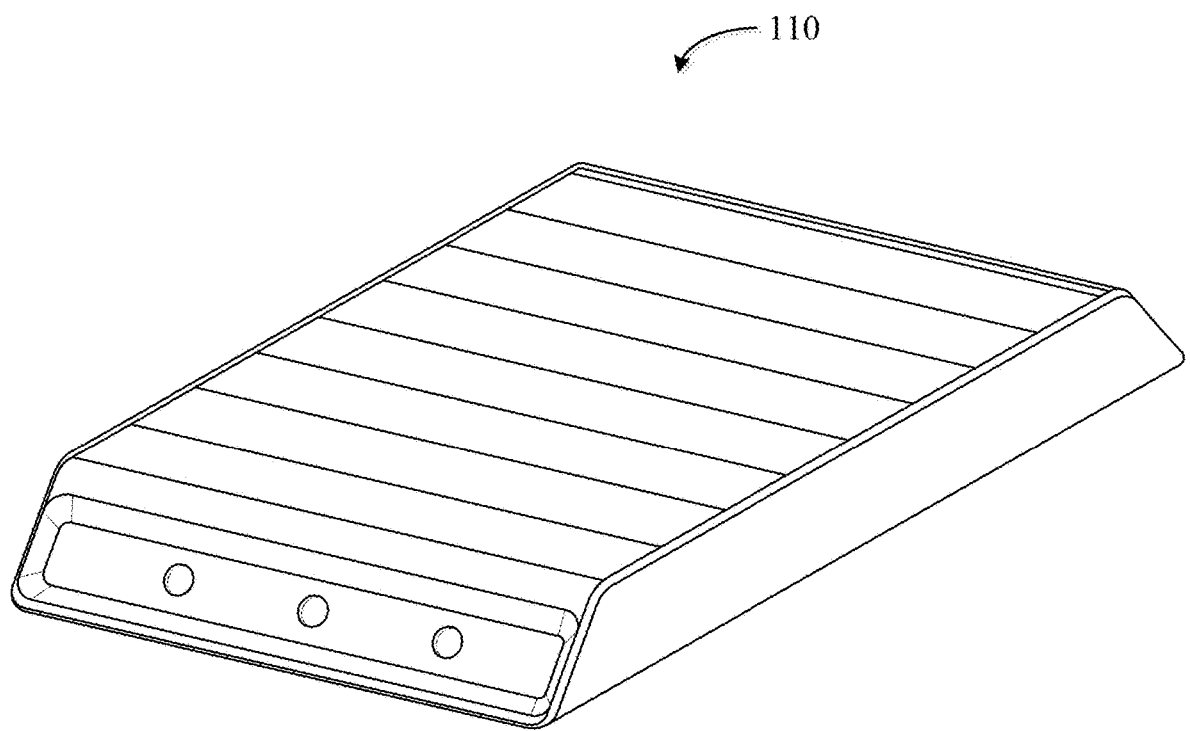
FIG. 10 is a perspective view of a smart roadway stud, according to one or more embodiments of the presently disclosed subject matter.

FIG. 10 is a perspective view of a smart roadway stud 110, according to one or more embodiments of the presently disclosed subject matter. According to one embodiment of the presently disclosed subject matter, the stud 110 may have a substantially flat, rectangular profile. The flat architecture includes a prismatic battery, allowing the device to fit within the road stripe depth, in a simple, wet-epoxy, road assembly package.

Figure 11:
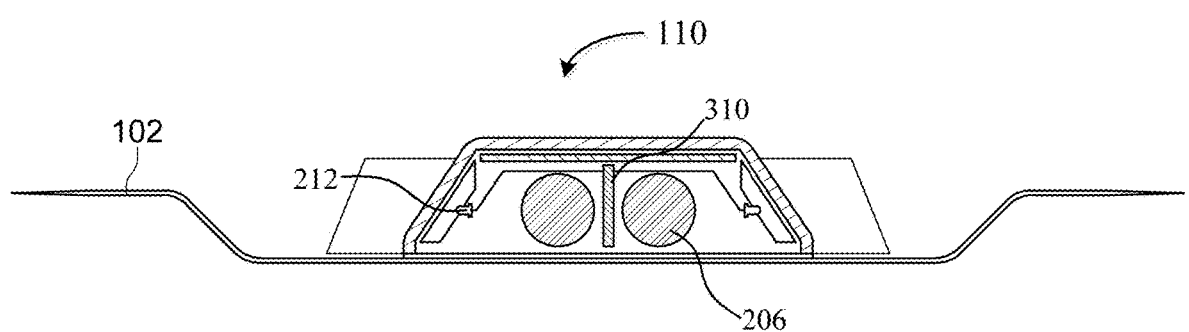
FIG. 11 is a side view of a smart roadway stud, according to one or more embodiments of the presently disclosed subject matter.

FIG. 11 is a side view of a smart roadway stud 110, according to one or more embodiments of the presently disclose subject matter. The potted construction of the stud 110, in FIG. 11, creates a low-cost, highly-durable stud 110 with a simple wet-epoxy attachment to the roadway 102.

Figure 12:
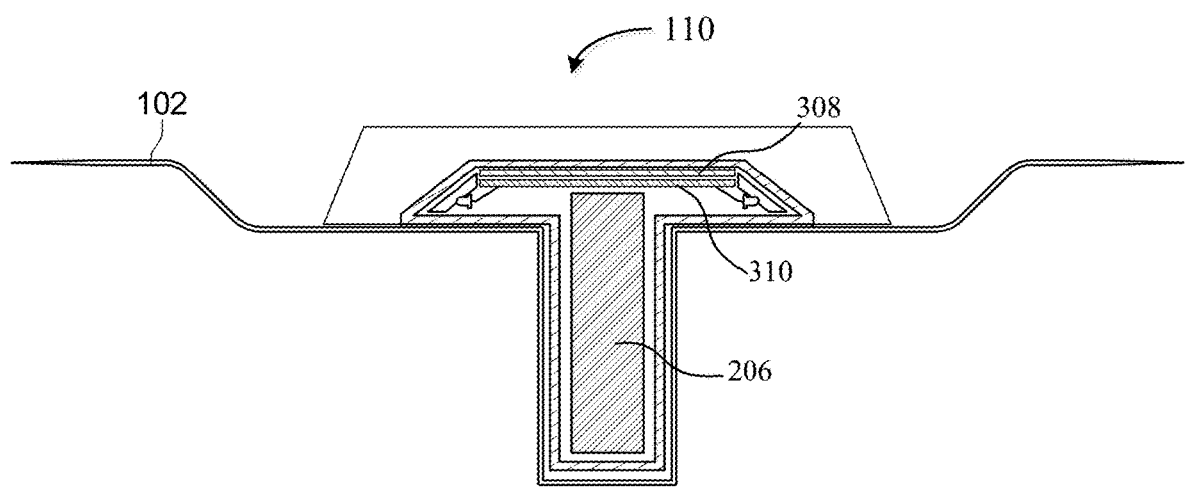
FIG. 12 is a side view of a smart roadway stud, according to one or more embodiments of the presently disclosed subject matter.

FIG. 12 is a side view of a smart roadway stud 110, according to one or more embodiments of the presently disclosed subject matter. The large boss requires a drilled hole in the road surface, which acts to better anchor this stud 110. The embodiment illustrated in FIG. 12 may have its entire height contained inside a line-marker cut. The implication is more stability but greater installed cost.

Figure 13:
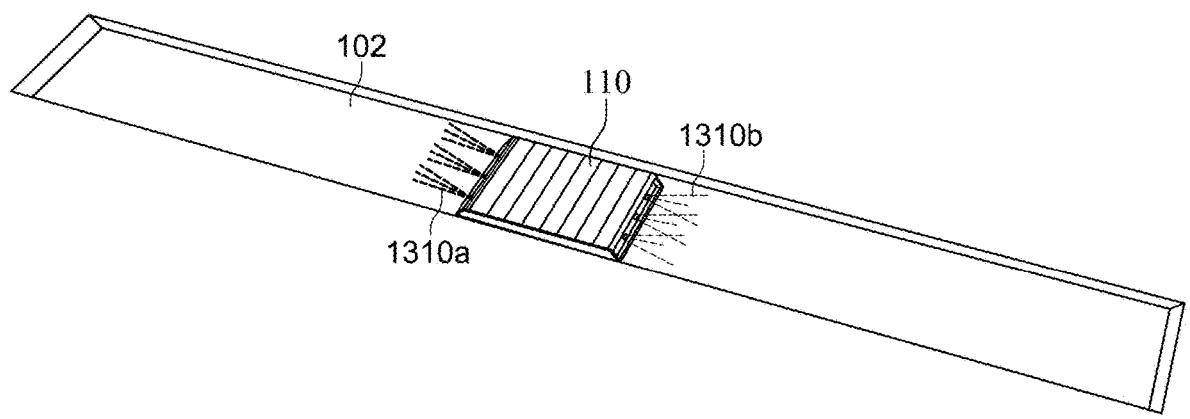
FIG. 13 is a top view of a smart roadway stud on a roadway, according to one or more embodiments of the presently disclosed subject matter.

FIG. 13 is a top view of a smart roadway stud 110 on the roadway 102, according to one or more embodiments of the presently disclosed subject matter. The low profile of the stud 110, illustrated in FIG. 13, allows it to rest relatively flush with the surface of the roadway 102. As illustrated in FIG. 13, light 1310 may emit from both ends of the stud 110. The light 1310a may be the same or different in color, duration, and intensity from the light 1310b.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The computer may include a tablet, laptop, desktop, or it may include one or more servers used to implement cloud services.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A roadway stud comprising:
a processor;
a wireless communication interface electrically coupled with the processor and configured to communicate with a local control system positioned above a roadway;
a vehicle detector electrically coupled with the processor, wherein:
the vehicle detector includes a magnetic sensor;
the processor is configured for:
recording a magnetic field change detected by the magnetic sensor adjacent to the roadway stud including a magnitude, an orientation, and a duration of the magnetic field change; and
transmitting a roadway stud identifier, a timestamp, the magnitude, the orientation, and the duration of the magnetic field change to the local control system via the wireless communication interface; and
the local control system is configured for:
determining a size of a vehicle based on the magnitude; and
determining a speed of the vehicle based on the duration; and
wirelessly communicating with additional roadway studs positioned along a path of the roadway;
and
a light source electrically coupled with the processor, wherein the processor is further configured to illuminate the light source upon receiving a first activation signal from the local control system via the wireless communication interface, wherein the light source and the vehicle detector are configured to allow the roadway stud to be installed to identify a lane boundary to a driver of the vehicle and to detect the magnetic field change.

2. The roadway stud of claim 1, wherein the first activation signal is received from another roadway stud.

3. The roadway stud of claim 1, wherein the first activation signal is received from a roadway stud control system and the roadway stud control system is configured to wirelessly communicate with a plurality of roadway studs.

4. The roadway stud of claim 1 further comprising an ambient temperature sensor electrically coupled with the processor, and the processor is further configured to transmit environmental data via the wireless communication interface associated with the ambient temperature sensor.

5. The roadway stud of claim 1 further comprising an ambient humidity sensor electrically coupled with the processor, and the processor is further configured to transmit environmental data via the wireless communication interface associated with the ambient humidity sensor.

6. The roadway stud of claim 1, wherein the first activation signal is associated with an environmental threshold being exceeded.

7. The roadway stud of claim 1 further comprising:
an ambient temperature sensor electrically coupled with the processor; and
an ambient humidity sensor electrically coupled with the processor, wherein the processor is further configured to detect an environmental threshold being exceeded based on temperature data received from the ambient temperature sensor and humidity data received from the ambient humidity sensor.

8. The roadway stud of claim 1 further comprising an ambient light sensor electrically coupled with the processor, wherein the processor is configured to control an illuminance level of the light source based at least partially on ambient light data provided by the ambient light sensor.

9. The roadway stud of claim 1 further comprising a global positioning system (GPS) receiver electrically coupled with the processor, wherein the processor is further configured to transmit a location of the roadway stud via the wireless communication interface.

10. The roadway stud of claim 1, wherein the processor is configured to receive a unique string identifier associated with the roadway stud and the processor is configured to transmit the unique string identifier via the wireless communication interface.

11. The roadway stud of claim 1 further comprising a Doppler radar detector, wherein the processor is further configured to transmit speed data via the wireless communication interface associated with a vehicle monitored by the Doppler radar detector.

12. The roadway stud of claim 1, wherein the processor is configured to activate a first color of the light source upon receiving the first activation signal via the wireless communication interface, and the processor is further configure to activate a second color of the light source upon receiving a second activation signal via the wireless communication interface.

13. The roadway stud of claim 1, wherein the processor is further configured to illuminate the light source using a first illumination sequence based on the first activation signal, and the processor is further configured to illuminate the light source using a second illumination sequence upon receiving a second activation signal via the wireless communication interface.

14. The roadway stud of claim 13, wherein the first illumination sequence includes first sequence timing information configured for illuminating the light source to provide a visual pattern with additional light sources of the additional roadway studs to indicate a current safe travel speed for the driver of the vehicle.

15. The roadway stud of claim 14, wherein the visual pattern appears to the driver of the vehicle to be moving towards the vehicle when the vehicle is exceeding the current safe travel speed.

16. The roadway stud of claim 1 further comprising a backscatter detector electrically coupled with the processor, wherein the backscatter detector is configured for detecting airborne visual inhibitors affecting viewing of the light source when installed on a roadway.

17. The roadway stud of claim 1, wherein the lane boundary is an edge of the roadway.

\* \* \* \* \*